United States Patent
Kobashi et al.

(10) Patent No.: US 8,825,254 B2
(45) Date of Patent: Sep. 2, 2014

(54) INVERTED PENDULUM TYPE VEHICLE, AND CONTROL METHOD OF INVERTED PENDULUM TYPE VEHICLE

(71) Applicant: Honda Motor Co., Ltd., Tokyo (JP)

(72) Inventors: Shinichiro Kobashi, Saitama (JP); Kazushi Akimoto, Saitama (JP); Hideo Murakami, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/965,631

(22) Filed: Aug. 13, 2013

(65) Prior Publication Data
US 2014/0067177 A1    Mar. 6, 2014

(30) Foreign Application Priority Data
Aug. 31, 2012  (JP) .................. 2012-192209

(51) Int. Cl.
*B62K 5/023* (2013.01)
*B62K 3/00* (2006.01)
*B62H 1/12* (2006.01)
*B62K 1/00* (2006.01)

(52) U.S. Cl.
CPC .... *B62K 3/007* (2013.01); *B62H 1/12* (2013.01); *B62K 1/00* (2013.01)
USPC .......................................................... 701/22

(58) Field of Classification Search
None
See application file for complete search history.

(56) References Cited

U.S. PATENT DOCUMENTS

| | | | |
|---|---|---|---|
| 6,969,079 B2* | 11/2005 | Kamen et al. ............... 280/204 |
| 7,337,040 B2 | 2/2008 | Takenaka et al. |
| 2007/0296170 A1* | 12/2007 | Field et al. ............. 280/47.131 |
| 2008/0295595 A1* | 12/2008 | Tacklind et al. .............. 73/462 |
| 2009/0107240 A1* | 4/2009 | Senba et al. ............. 73/514.36 |
| 2010/0017069 A1* | 1/2010 | Miki et al. ..................... 701/48 |
| 2010/0237645 A1* | 9/2010 | Trainer ......................... 296/21 |
| 2011/0115279 A1* | 5/2011 | Gomi et al. ................ 301/5.23 |
| 2012/0168235 A1 | 7/2012 | Gomi et al. |

FOREIGN PATENT DOCUMENTS

| | | |
|---|---|---|
| JP | 4181113 B2 | 11/2008 |
| WO | 2008/132778 A1 | 11/2008 |
| WO | 2008/132779 A1 | 11/2008 |
| WO | 2011/033575 A1 | 3/2011 |

* cited by examiner

*Primary Examiner* — John R Olszewski
*Assistant Examiner* — Jess Whittington
(74) *Attorney, Agent, or Firm* — Carrier Blackman & Associates, P.C.; Joseph P. Carrier; William D. Blackman

(57) ABSTRACT

A controller 21 of a vehicle 1 is equipped with a first control 24, which is configured to control a first actuator 8 so as to move a traveling motion unit 3 according to tilting of an occupant mounting section 5, and a second control unit 25, which is configured to control, in a case where a turning command is output from a joystick 12, an electric motor 14 such that a steering direction of a wheel 4 viewed from above the vehicle 1 becomes tilted with respect to a direction of a moving velocity vector V of the traveling motion unit 3.

5 Claims, 9 Drawing Sheets

INVERTED PENDULUM TYPE VEHICLE, AND CONTROL METHOD OF INVERTED PENDULUM TYPE VEHICLE

BACKGROUND OF THE INVENTION

1. Field of the Invention

The present invention relates to an inverted pendulum type vehicle capable of traveling on a floor surface, and a control method of the inverted pendulum type vehicle.

2. Description of the Related Art

Conventionally, there has been known an inverted pendulum type vehicle including a base body which is assembled with a traveling motion unit which travels on a floor surface and an actuator which actuates the traveling motion unit, and an occupant mounting section capable of tilting freely with respect to a vertical direction and which is assembled to the base body (refer to Patent Document 1). This inverted pendulum type vehicle is a vehicle which controls the traveling operation of the traveling motion unit, in a manner of moving a fulcrum of the inverted pendulum, so that the occupant mounting unit with the occupant mounted does not tilt and fall.

For example, in Patent Document 1 and the like, the inverted pendulum type vehicle capable of moving in all directions, on the floor surface, including a longitudinal direction and a lateral direction of the occupant, by driving the traveling motion unit according to tilting and the like of the occupant mounting section, has been proposed by the present applicant.

CITATION LIST

Patent Document

Patent Document 1: WO 2011/33575

SUMMARY OF THE INVENTION

In the conventional inverted pendulum type vehicle such as the one disclosed in Patent Document 1, it is possible for an occupant to perform turning of the vehicle, by moving an upper body of the occupant so as to change a moving direction of the vehicle gradually. However, generally, a skillful maneuvering technique of the occupant is necessary for performing turning smoothly. Specifically, in a state where the inverted pendulum type vehicle is stopped, or in a semi-travel stopped state in which the inverted pendulum type vehicle is traveling at a low speed such as in a travel velocity lower than a predetermined value preliminarily set, it had been difficult even for the skilled rider to perform turning of the inverted pendulum type vehicle.

The present invention has been made in view of such background, and aims at providing an inverted pendulum type vehicle and a control method of the inverted pendulum type vehicle in which an occupant is capable of turning the vehicle easily, without requiring skillful maneuvering technique and the like of the occupant.

The present invention provides an inverted pendulum type vehicle at least comprising: a traveling motion unit configured to be capable of traveling on a floor surface; a first actuator that drives the traveling motion unit; a base body to which the traveling motion unit and the first actuator are installed; and an occupant mounting section attached to the base body such that the occupant mounting section is tiltable relative to a vertical direction, wherein the traveling motion unit is configured to be capable of traveling in all directions, including a longitudinal direction and a lateral direction relative to an occupant on the occupant mounting section, by a driving force of the first actuator, the inverted pendulum type vehicle further including: a wheel, which is connected to the traveling motion unit or the base body at an interval from the traveling motion unit in the longitudinal direction, which is configured to be capable of rolling freely on the floor surface, and which is provided so as to be steered in a yaw direction; a second actuator which steers the wheel in the yaw direction; a turning command output unit configured to output a turning command for turning the inverted pendulum type vehicle; and a controller configured to control operations of the first actuator and the second actuator, wherein the controller is equipped with a first control unit which is configured to control the first actuator so as to make the traveling motion unit travel at least according to tilting of the occupant mounting section, and a second control unit configured to control the second actuator such that, in a case where the turning command is output from the turning command output unit, a steering direction of the wheel viewed from above the inverted pendulum type vehicle is changed with respect of a direction of a moving velocity vector of the traveling motion unit.

According to the present invention, the controller controls the steering direction of the wheel in the yaw direction by actuating the second actuator, in order to perform turning according to the turning command. By doing so, the rolling direction of the wheel becomes in the state changed with respect to the direction of the moving velocity vector of the traveling motion unit. When the controller makes the traveling motion unit travel by actuating the first actuator in this state, the inverted pendulum type vehicle may be turned easily, without requiring skillful maneuvering technique of an occupant and the like, since the rolling direction of the wheel is changed with respect to the traveling direction of the traveling motion unit.

In the present invention, it is preferable that the first control unit is configured to control a moving velocity of the traveling motion unit at least according to a deviation between a desired tilt angle which is a desired value of a tilt angle of the occupant mounting section and an observed value of a tilt angle of the occupant mounting section via the first actuator, and equipped with a desired tilt angle setting unit which is configured to set, in a case where the turning command is output from the turning command output unit, in a travel stopped state in which traveling of the traveling motion unit is stopped, or in a semi-travel stopped state in which a magnitude of a moving velocity of the traveling motion unit becomes smaller than a predetermined value set preliminarily, the desired tilt angle such that a magnitude of a moving velocity component in the lateral direction of the traveling motion unit becomes larger than that in the travel stopped state or the semi-travel stopped state, with a control of the moving velocity of the traveling motion unit according to the deviation by the first control unit.

By doing so, in a case where the turning of the inverted pendulum type vehicle is difficult, such as in the travel stopped state or the semi-travel stopped state, the desired tilt angle setting unit sets the desired tilt angle such that the magnitude of the moving velocity component of the traveling motion unit in the lateral direction becomes larger. By doing so, the inverted pendulum type vehicle at least travels in the lateral direction. Therefore, it becomes easy to turn the inverted pendulum type vehicle by the steering of the wheel.

In the present invention, it is preferable that the turning command includes an angular velocity command value indicating a desired value of an angular velocity in a yaw direction of the inverted pendulum type vehicle, and the desired tilt angle setting unit sets, in a case where the turning command is output from the turning command output unit in the travel stopped state or the semi-travel stopped state, the desired tilt angle such that the magnitude of the moving velocity component in the lateral direction of the traveling motion unit becomes larger as a magnitude of the desired value of the angular velocity indicated by the angular velocity command value becomes larger.

By doing so, in the case where the angular velocity command value included in the turning command is large, that is, in the case where the angular velocity required when the inverted pendulum type vehicle turns is large, the desired tilt angle setting unit sets the moving velocity of the inverted pendulum type vehicle at least in the lateral direction large, so that it becomes easy to turn the inverted pendulum type vehicle so as to satisfy the angular velocity command value.

In the present invention, it is preferable that the desired tilt angle setting unit sets, in a case where the turning command is output from the turning command output unit in the semi-travel stopped state, the desired tilt angle such that the magnitude of the moving velocity component in the lateral direction of the traveling motion unit becomes larger as the magnitude of the moving velocity of the traveling motion unit in the semi-travel stopped state becomes smaller.

By doing so, the moving velocity of the traveling motion unit in the lateral direction becomes larger as the moving velocity of the traveling motion unit in the semi-travel stopped state becomes smaller, it becomes easy to turn the inverted pendulum type vehicle by the steering of the wheel. Further, it becomes possible to suppress the moving velocity of the traveling motion unit in the lateral direction from increasing, when the moving velocity of the traveling motion unit in the semi-travel stopped state is large.

In the present invention, it is preferable that the second control unit determines a desired steering angle which is a desired value of a steering angle of the wheel, using an observed value or a desired value of an actual moving velocity of the traveling motion unit, and an observed value or a desired value of an angular velocity in the yaw direction of the inverted pendulum type vehicle, based on a model representing a rotational behavior of the inverted pendulum type vehicle in the yaw direction according to a steering of the wheel, and controls the second actuator according to the desired steering angle. By doing so, the desired steering angle is determined on the basis of the model representing the rotational behavior of the inverted pendulum type vehicle in the yaw direction according to the steering of the wheel. Therefore, the steering angle of the wheel becomes an angle appropriate for turning the inverted pendulum type vehicle, and it becomes easy to turn the inverted pendulum type vehicle.

The present invention provides a control method of an inverted pendulum type vehicle at least including: a base body; an occupant mounting section attached to the base body such that the occupant mounting section is tiltable relative to a vertical direction; a traveling motion unit attached to the base body and configured to be capable of traveling on a floor surface in all directions, including a longitudinal direction and a lateral direction relative to an occupant on the occupant mounting section; a first actuator attached to the base body and that drives the traveling motion unit; a wheel, which is connected to the traveling motion unit or the base body at an interval from the traveling motion unit in the longitudinal direction, which is configured to be capable of rolling on the floor surface, and which is provided so as to be steered in a yaw direction; a second actuator which steers the wheel in the yaw direction; and a turning command output unit configured to output a turning command, wherein the control method includes a step of setting a desired tilt angle which is a desired value of a tilt angle of the occupant mounting section, in a case where the turning command is output from the turning command output unit, a step of controlling a moving velocity of the traveling motion unit via the first actuator, according to a deviation between the desired tilt angle and an observed value of the tilt angle of the occupant mounting section, and a step of controlling, in a case where the turning command is output from the turning command output unit, the second actuator such that a steering direction of the wheel viewed from above the inverted pendulum type vehicle becomes changed with respect to a direction of a moving velocity vector of the traveling motion unit, and wherein the step of setting the desired tilt angle sets, in a case where the turning command is output from the turning command output unit, in a travel stopped state in which traveling of the traveling motion unit is stopped, or in a semi-travel stopped state in which a magnitude of a moving velocity of the traveling motion unit becomes smaller than a predetermined value set preliminarily, the desired tilt angle such that a magnitude of a moving velocity component in the lateral direction of the traveling motion unit becomes larger than that in the travel stopped state or the semi-travel stopped state.

According to the present invention, in the case where the turning of the inverted pendulum type vehicle is difficult, such as in the travel stopped state or the semi-travel stopped state, the desired tilt angle is set so that the magnitude of the moving velocity component of the traveling motion unit in the lateral direction becomes larger. Further, by controlling the steering direction of the wheel for performing turning according to the turning command, the rolling direction of the wheel becomes in the state changed with respect to the direction of the moving velocity vector of the traveling motion unit. Therefore, when the inverted pendulum type vehicle travels, the inverted pendulum type vehicle may be easily turned, without requiring the skillful maneuvering technique of the occupant and the like.

DESCRIPTION OF THE PREFERRED EMBODIMENTS

Figure 1:
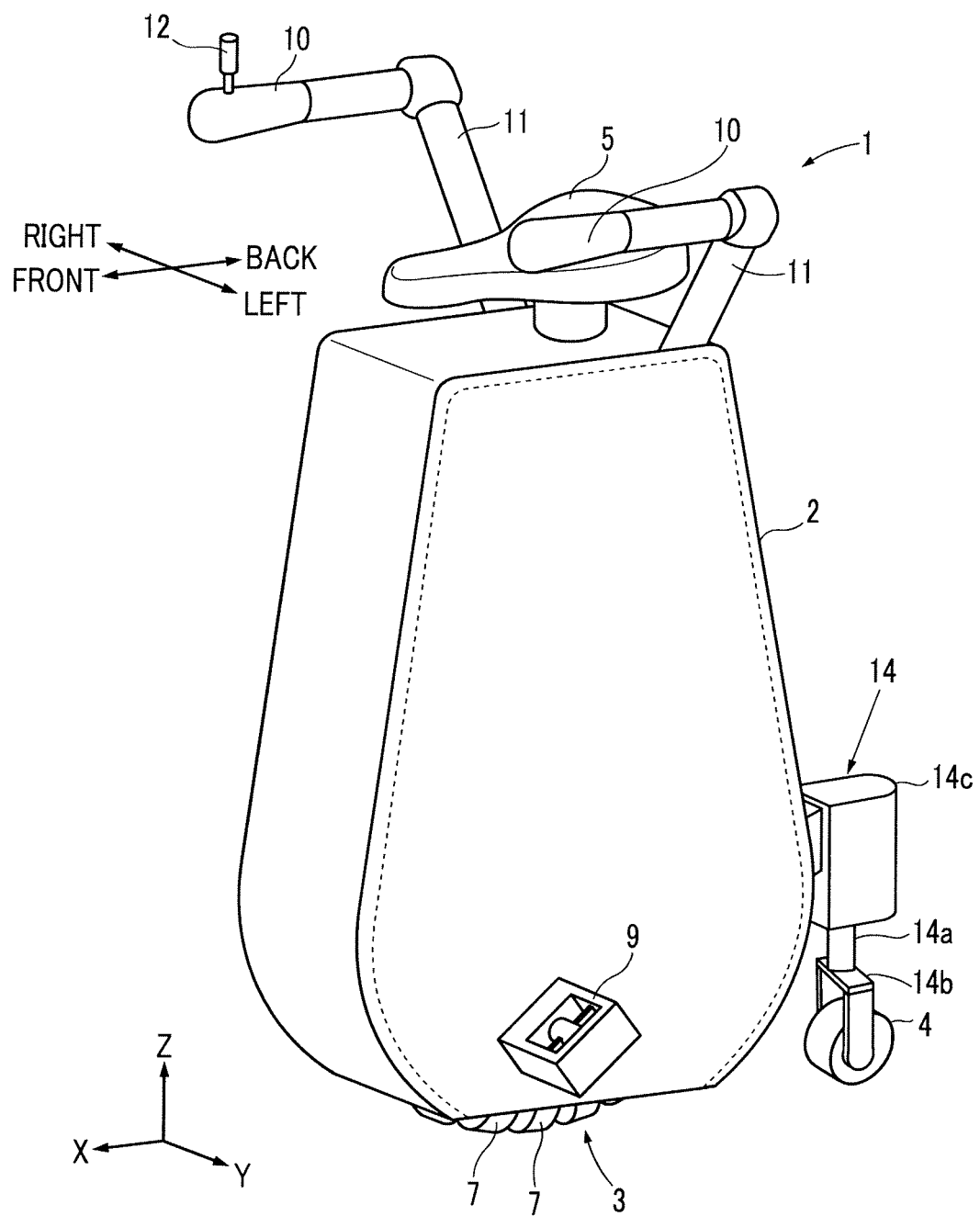
FIG. 1 is a perspective view illustrating the appearance of an inverted pendulum type vehicle according to a first embodiment of the present invention.
Figure 2:
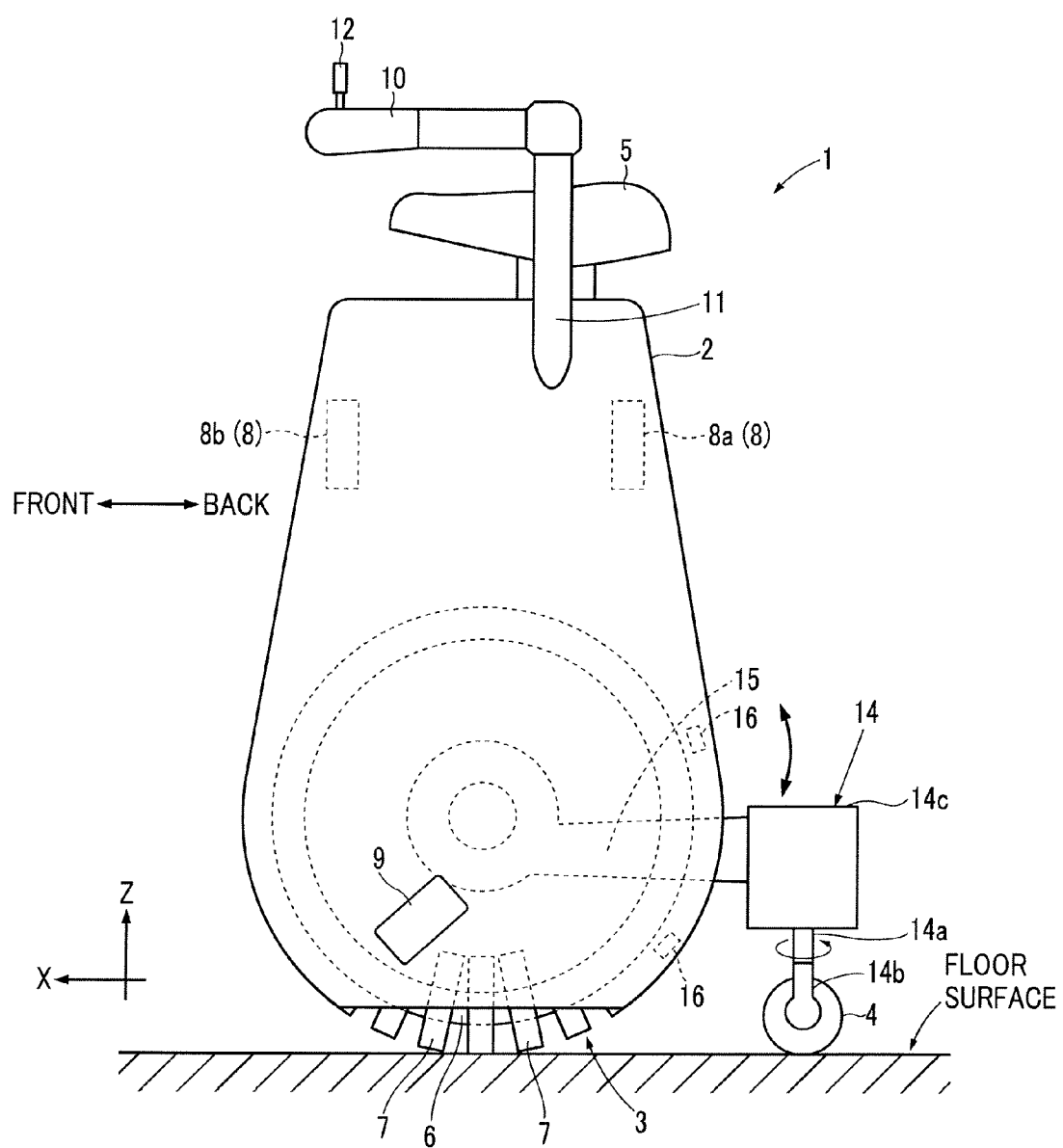
FIG. 2 is a side view of the inverted pendulum type vehicle according to the first embodiment.

An inverted pendulum type vehicle of an embodiment of the present invention will be described. As illustrated in FIG. 1 and FIG. 2, an inverted pendulum type vehicle 1 according to the present embodiment (hereinafter referred to simply as the vehicle 1 in some cases) has a base body 2, a traveling motion unit 3 which is capable of traveling on a floor surface, a wheel 4, and an occupant mounting section 5 on which an occupant mounts.

The traveling motion unit 3 includes a circular core member 6 shown in FIG. 2 (hereinafter referred to as the annular core member 6) and a plurality of circular rollers 7 mounted on the annular core member 6 such that the circular rollers 7 are arranged at equiangular intervals in the circumferential direction (in a direction about the axial center) of the annular core member 6. Each of the rollers 7 is externally inserted into the annular core member 6 with its rotational axial center directed toward the circumference of the annular core member 6. Further, each of the rollers 7 is configured to be rotatable integrally with the annular core member 6 about the axial center of the annular core member 6. In addition, each of the rollers 7 is configured to be rotatable about the central axis of the cross-sectional plane of the annular core member 6 (a circumferential axis about the axial center of the annular core member 6).

The traveling motion unit 3 having the annular core member 6 and the plurality of the rollers 7 comes in contact with a floor surface through the intermediary of the rollers 7 (the rollers 7 positioned in a lower portion of the annular core member 6), the axial center of the annular core member 6 being directed in parallel to the floor surface. In this ground contact state, the annular core member 6 is rotatively driven about the axial center thereof so as to cause all the annular core member 6 and the rollers 7 to circumrotate. This in turn causes the traveling motion unit 3 to travel on the floor surface in a direction orthogonal to the axial center of the annular core member 6. In the ground contact state, rotatively driving each roller 7 about its rotational axial center causes the traveling motion unit 3 to travel in the direction of the axial center of the annular core member 6.

Further, rotatively driving the annular core member 6 and rotatively driving each roller 7 cause the traveling motion unit 3 to travel in a direction at an angle with respect to the direction orthogonal to the axial center of the annular core member 6 and the direction of the axial center of the annular core member 6.

Thus, the traveling motion unit 3 is capable of traveling on the floor surface in all directions. In the following description, of the traveling directions of the traveling motion unit 3, the direction orthogonal to the axial center of the annular core member 6 is defined as X-axis direction, the direction of the axial center of the annular core member 6 is defined as Y-axis direction, and a vertical direction is defined as Z-axis direction, as illustrated in FIG. 1 and FIG. 2. In addition, a front direction is defined as the positive direction of the X-axis, a left direction is defined as the positive direction of the Y-axis, and an upper direction is defined as a positive direction of the Z-axis.

The traveling motion unit 3 is installed to the base body 2. More specifically, the base body 2 is provided, covering the traveling motion unit 3 except for a lower portion thereof in contact with the floor surface. Further, the base body 2 supports the annular core member 6 of the traveling motion unit 3 such that the annular core member 6 is rotatable about the axial center thereof.

In this case, the base body 2 uses the axial center of the annular core member 6 of the traveling motion unit 3 as the supporting point thereof and the base body 2 can be tilted about the axial center (about the Y-axis). Further, the base body 2 is tiltable about the X-axis orthogonal to the axial center of the annular core member 6 by tilting together with the traveling motion unit 3 relative to the floor surface, the ground contact portion of the traveling motion unit 3 being the supporting point. Thus, the base body 2 is tiltable about two axes relative to the vertical direction.

The base body 2 includes therein a first actuator 8, which generates a driving force for moving the traveling motion unit 3, as illustrated in FIG. 2. The first actuator 8 is constituted of an electric motor 8a serving as the actuator that rotatively drives the annular core member 6 and an electric motor 8b serving as the actuator that rotatively drives each of the rollers 7. The electric motors 8a and 8b impart rotative driving forces to the annular core member 6 and each roller 7 through the intermediary of a motive power transmitting mechanisms (not shown). The motive power transmitting mechanisms may have publicly known constructions.

The traveling motion unit 3 may have a construction different from the aforesaid construction. For example, the traveling motion unit 3 and the driving system thereof may adopt the constructions proposed by the applicant of the present application in PCT WO/2008/132778 or PCT WO/2008/132779.

Further, the occupant mounting section 5 is installed to the base body 2. The occupant mounting section 5 is formed of a seat, on which an occupant sits, and fixed to the upper end portion of the base body 2. An occupant can sit on the occupant mounting section 5, the longitudinal direction thereof being the X-axis direction and the lateral direction thereof being the Y-axis direction. The occupant mounting section 5 (the seat) is secured to the base body 2, so that the occupant mounting section 5 can be tilted integrally with the base body 2 relative to the vertical direction.

Further attached to the base body 2 are a pair of footrests 9 and 9, on which the occupant sitting on the occupant mounting section 5 places his/her feet, and a pair of handles 10 and 10 held by the occupant.

The footrests 9 and 9 are protrusively provided in lower portions of both sides of the base body 2. In FIG. 1 and FIG. 2, one (the right one) of the footrests 9 is not shown.

The handles 10 and 10 are formed of bar-like members disposed extendedly in the X-axis direction (the longitudinal direction) on both sides of the occupant mounting section 5 and are respectively fixed to the base body 2 through rods 11 extended from the base body 2. Further, a joystick 12 serving as a turning command output unit is attached to one handle 10 (the right handle 10 in the drawing) of the pair of handles 10 and 10.

The joystick 12 can be swung in the longitudinal direction (the X-axis direction) and the lateral direction (the Y-axis direction). The joystick 12 outputs an operation signal indicative of the amount of swing in the longitudinal direction (the X-axis direction) as a command for moving the vehicle 1 forward or backward. The joystick 12 also outputs an operation signal indicative of the amount of swing in the lateral direction (the Y-axis direction) as a command for turning the vehicle 1 to the right (clockwise) or the left (counterclockwise), i.e., a turning command.

Regarding the amount of swing of the joystick 12 in the longitudinal direction, i.e., the amount of rotation about the Y-axis, in the present embodiment, the amount of a forward swing is positive, while the amount of a backward swing is negative. Regarding the amount of a lateral swing of the joystick 12, i.e., the amount of rotation about the X-axis, the amount of a leftward swing is positive, while the amount of a rightward swing is negative.

The wheel 4 is arranged at a rearward of the traveling motion unit 3, with an interval from the traveling motion unit 3 in a longitudinal direction. At this time, the wheel 4 is in contact with the floor surface. Further, the wheel 4 is coupled to the base body 2. More specifically, above the wheel 4, a housing 14c which stores a rotor (not shown) and the like of an electric motor 14 is arranged. An arm 15 which extends rearward from the base body 2 is coupled to the housing 14c. The arm 15 is axially supported by the base body 2, so as to be capable of swinging about the axial center of the annular core member 6 of the traveling motion unit 3. Further, an output shaft 14a which outputs a rotational output of the electric motor 14 to the outside is extended from the housing 14c. The output shaft 14a is extended so as to rotate about the axial center in the vertical direction. Further, a supporting unit 14b is coupled to the output shaft 14a, which axially supports the wheel 4 so as to be freely rotatable about a rotational axial center of rolling motion of the wheel 4. As such, the wheel 4 is coupled to the base body 2 via the housing 14c, the output shaft 14a, and the supporting unit 14b.

Further, the housing 14c is capable of freely swinging about the axial center of the annular core member 6 of the traveling motion unit 3 with respect to the base body 2, by the swinging of the arm 15. By doing so, it becomes possible to tilt the occupant mounting section 5 together with the base body 2 about the Y-axis, while contacting both the traveling motion unit 3 and the wheel 4 to the ground.

Alternatively, the arm 15 may be rotatably supported by the axial center portion of the annular core member 6 of the traveling motion unit 3, and the wheel 4 may be joined to the traveling motion unit 3 through the arm 15.

Further, the wheel 4 is capable of being steered in a yaw direction, by the driving of the electric motor 14. The yaw direction is a rotational direction about the Z-axis.

The base body 2 is provided with a pair of stoppers 16 and 16 that restricts the swing range of the arm 15. Hence, the arm 15 is allowed to swing within the range defined by the stoppers 16 and 16. This restricts the swing range of the wheel 4 about the axial center of the annular core member 6 of the traveling motion unit 3 and consequently the range of tilt of the base body 2 and the occupant mounting section 5 about the Y-axis. As a result, the base body 2 and the occupant mounting section 5 are prevented from excessively tilting toward the rear side of the occupant.

The wheel 4 may be urged by a spring so as to be pressed against the floor surface.

The above has described the mechanical configuration of the vehicle 1 according to the present embodiment.

Figure 3:
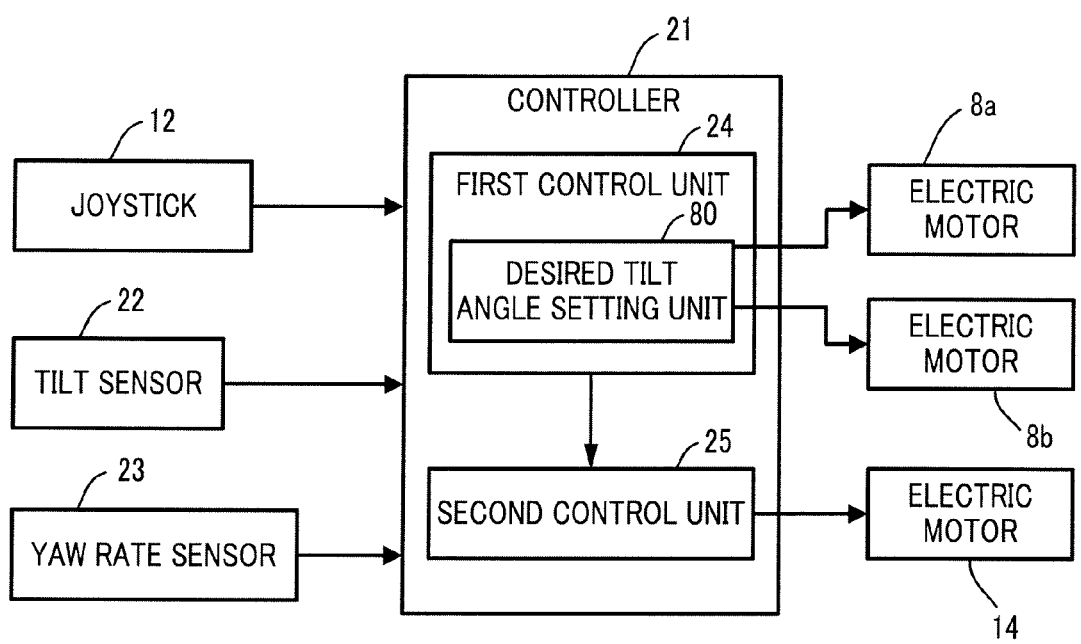
FIG. 3 is a block diagram illustrating the configuration for controlling the inverted pendulum type vehicle according to the first embodiment.

Although not shown in FIG. 1 and FIG. 2, in order to control the operation of the vehicle 1, i.e., to control the operations of the traveling motion unit 3 and the wheel 4, the base body 2 of the vehicle 1 in the present embodiment incorporates a controller 21 constituted of an electronic circuit unit, which includes a CPU, a RAM, a ROM and the like, a tilt sensor 22 for measuring the tilt angle of the occupant mounting section 5 (the tilt angle of the base body 2) relative to the vertical direction, and a yaw rate sensor 23 for measuring the angular velocity of the vehicle 1 about the yaw axis, as illustrated in FIG. 3.

The controller 21 receives outputs of the joystick 12 and detection signals of the tilt sensor 22 and the yaw rate sensor 23.

The controller 21 may alternatively be constituted of a plurality of electronic circuit units adapted to communicate with each other.

The tilt sensor 22 is constituted of, for example, an acceleration sensor and an angular velocity sensor, such as a gyro sensor. The controller 21 uses a publicly known method to acquire the measurement value of the tilt angle of the occupant mounting section 5, i.e., the tilt angle of the base body 2, from the detection signals of the acceleration sensor and the angular velocity sensor. As the method, the one proposed by the applicant of the present application in, for example, Japanese Patent No. 4181113 may be adopted.

More specifically, the tilt angle of the occupant mounting section 5 (or the tilt angle of the base body 2) in the present embodiment is the tilt angle (a set of a tilt angle in the direction about the X-axis and a tilt angle in the direction about the Y-axis), which uses, as its reference (zero: 0), the posture of the occupant mounting section 5 (or the base body 2) in a state wherein the center of gravity of the combination of the vehicle 1 and the occupant mounted on the occupant mounting section 5 in a predetermined posture (standard posture) is positioned right above the ground contact portion of the traveling motion unit 3 (upward in the vertical direction).

The yaw rate sensor 23 is composed of an angular velocity sensor, such as a gyro sensor. Based on a detection signal of the yaw rate sensor 23, the controller 21 acquires the measurement value of the angular velocity of the vehicle 1 about the yaw axis.

To provide a function implemented by an installed program or the like (a function implemented by software) or a function implemented by hardware in addition to the function for acquiring the measurement values as described above, the controller 21 further includes a first control unit 24, which controls the electric motors 8a and 8b constituting the first actuator 8 thereby to control the traveling motion of the traveling motion unit 3 and a second control unit 25, which controls the electric motor 14 serving as the second actuator thereby to control the steering in the yaw direction of the wheel 4. Further, the first control unit 24 is equipped with a desired tilt angle setting unit 80 (details thereof will be explained hereinafter) which sets a desired tilt angle which is a desired value of a tilt angle of the occupant mounting section 5.

The first control unit 24 carries out the arithmetic processing, which will be discussed hereinafter, to sequentially calculate a desired translational velocity Vw1_cmd_xy, which is the desired value of the traveling velocity (more specifically, the set of a translational velocity in the X-axis direction and a translational velocity in the Y-axis direction) of the traveling motion unit 3. Then, the first control unit 24 controls the rotational speed of each of the electric motors 8a and 8b thereby to match the actual traveling velocity of the traveling motion unit 3 to the desired translational velocity Vw1_cmd_xy.

In this case, the relationship between the rotational speed of each of the electric motors 8a and 8b and the actual traveling velocity of the traveling motion unit 3 is established beforehand. Hence, the desired value of the rotational speed of each of the electric motors 8a and 8b is specified on the basis of the desired translational velocity Vw1_cmd_xy of the traveling motion unit 3. Then, the rotational speeds of the electric motors 8a and 8b are feedback-controlled to the desired values specified on the basis of the desired translational velocity Vw1_cmd_xy, thereby controlling the actual traveling velocity of the traveling motion unit 3 to the desired translational velocity Vw1_cmd_xy.

Further, the second control unit 25 carries out the arithmetic processing, which will be discussed hereinafter, to sequentially calculate a desired steering angle θrz_cmd (details thereof will be explained hereinafter) which is a desired value of a steering angle of the wheel 4, and controls the rotational angle of the electric motor 14 thereby to match an actual steering angle θrz_act of the wheel 4 to the desired steering angle θrz_cmd. The steering angle is an angle when rotating in the yaw direction, that is, about the Z-axis, and the value becomes 0 when the rolling direction of the wheel 4 becomes the longitudinal direction, and an orientation in the counterclockwise rotation when the vehicle 1 is observed from above becomes a positive orientation.

In this case, a relationship between the rotational angle of the electric motor 14 and the actual steering angle θrz_act of the wheel 4 is set preliminarily, and a desired value of the rotational angle of the electric motor 14 is specified according to the desired steering angle θrz_cmd of the wheel 4. Then, the rotational angle of the electric motor 14 is feedback-controlled to the desired values specified on the basis of the desired steering angle θrz_cmd, thereby controlling the actual steering angle θrz_act of the wheel 4 to the desired steering angle θrz_cmd.

Next, the processing by the first control unit 24 and the second control unit 25 mentioned above will be explained in further detail below. First, with reference to FIG. 4 through FIG. 8, the processing by the first control unit 24 and the second control unit 25 will be explained.

Figure 4:
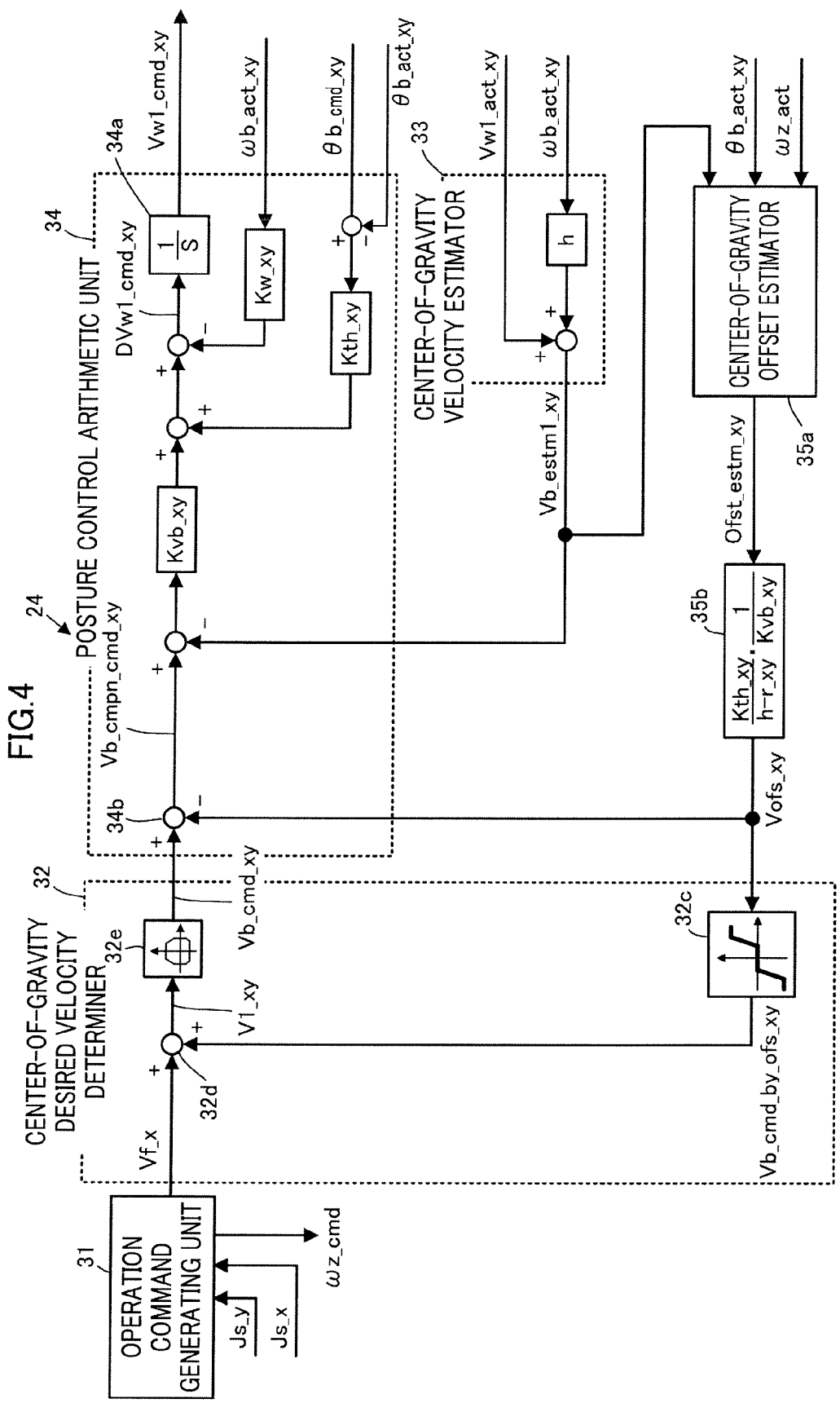
FIG. 4 is a block diagram illustrating the processing by a first control unit shown in FIG. 3.

As is shown in FIG. 4, the first control unit 24 is equipped with, as its main functional units, an operation command generating unit 31 which converts a swing amount (a rotational amount about the Y-axis) Js_x in the longitudinal direction and a swing amount (a rotational amount about the X-axis) Js_y in the lateral direction of the joystick 12, that are indicated by a manipulated signal input from the joystick 12, into a velocity command for traveling of the vehicle 1, a center-of-gravity desired velocity determiner 32 which determines a desired velocity of the total center of gravity of the combination of the vehicle 1 and the occupant mounted on the occupant mounting section 5 (hereinafter referred to as a vehicle system total center of gravity), a center-of-gravity velocity estimator 33 which estimates the velocity of the vehicle system total center of gravity, and a posture control arithmetic unit 34 which determines a desired value of a traveling velocity of the traveling motion unit 3 so as to stabilize the posture of the occupant mounting section 5 (the posture of the base body 2) while making the velocity of the estimated vehicle system total center of gravity follow the desired velocity. Then, the first control unit 24 executes the processing of each of the functional units at a predetermined arithmetic processing cycle of the controller 21.

In the present embodiment, the vehicle system total center of gravity has a meaning as an example of the representative point of the vehicle 1. Accordingly, the velocity of the vehicle system total center of gravity has a meaning as the translational moving velocity of the representative point.

Before specifically describing the processing carried out by each of the functional units of the first control unit 24, the basic matters of the processing will be described. The dynamic behavior of the vehicle system total center of gravity (more specifically, the behavior observed from the Y-axis direction and the behavior observed from the X-axis direction) is approximately expressed by a behavior of an inverted pendulum model shown in FIG. 5. The algorithm of the processing by the first control unit 24 is created on the basis of the behavior.

In the following description and FIG. 5, a suffix "_x" means a reference code of a variable or the like observed from the Y-axis direction, while a suffix "y" means a reference code of a variable or the like observed from the X-axis direction. Further, in FIG. 5, the reference codes of the variables observed from the Y-axis direction are not parenthesized, while the reference codes of the variables observed from the X-axis direction are parenthesized in order to illustrate both an inverted pendulum model observed from the Y-axis direction and an inverted pendulum model observed from the X-axis direction.

The inverted pendulum model expressing the behavior of the vehicle system total center of gravity observed from the Y-axis direction has a virtual wheel $61\_x$ which has a rotational axial center parallel to the Y-axis direction and which is circumrotatable on a floor surface (hereinafter referred to as "the virtual wheel $61\_x$"), a rod $62\_x$ which is extended from the rotational center of the virtual wheel $61\_x$ and which is swingable about the rotational axis of the virtual wheel $61\_x$ (in the direction about the Y-axis direction), and a mass point Ga_x connected to a reference portion Ps_x, which is the distal end portion (upper end portion) of the rod $62\_x$.

In the inverted pendulum model, it is assumed that the movement of the mass point Ga_x corresponds to the movement of the vehicle system total center of gravity observed from the Y-axis direction, and a tilt angle θb_x (the angle of a tilt in the direction about the Y-axis) of the rod $62\_x$ relative to the vertical direction agrees with the angle of a tilt of the occupant mounting section 5 (or the base body 2) in the direction about the Y-axis. Further, the translational movement of the traveling motion unit 3 in the X-axis direction corresponds to the translational movement in the X-axis direction by the circumrotation of the virtual wheel $61\_x$.

Further, a radius r_x of the virtual wheel $61\_x$ and a height h_x of each of the reference portion Ps_x and the mass point Ga_x from the floor surface are set to predetermined values (fixed values) set beforehand.

Similarly, the inverted pendulum model expressing the behavior of the vehicle system total center of gravity observed from the X-axis direction has a virtual wheel $61\_y$ which has a rotational axial center parallel to the X-axis direction and which is circumrotatable on the floor surface (hereinafter referred to as "the virtual wheel $61\_y$"), a rod $62y$ which is extended from the rotational center of the virtual wheel $61\_y$ and which is swingable about the rotational axis of the virtual wheel $61\_y$ (in the direction about the X-axis direction), and a mass point Ga_y connected to a reference portion Ps_y, which is the distal end portion (upper end portion) of the rod $62y$.

In the inverted pendulum model, it is assumed that the movement of the mass point Ga_y corresponds to the movement of the vehicle system total center of gravity observed from the X-axis direction, and a tilt angle θb_y (the angle of a tilt in the direction about the X-axis) of the rod $62y$ relative to the vertical direction agrees with the angle of a tilt of the occupant mounting section 5 (or the base body 2) in the direction about the X-axis. Further, the translational movement of the traveling motion unit 3 in the Y-axis direction corresponds to the translational movement in the Y-axis direction by the circumrotation of the virtual wheel $61\_y$.

Further, a radius r_y of the virtual wheel $61\_y$ and a height by of each of the reference portion Ps_y and the mass point Ga_y from the floor surface are set to predetermined values (fixed values) set beforehand. The height by of each of the reference portion Ps_y and the mass point Ga_y from the floor surface observed in the X-axis direction is the same as the height h_x of each of the reference portion Ps_x and the mass point Ga_x from the floor surface observed in the Y-axis direction. Hereinafter, therefore, h_x=h_y=h will apply.

The positional relationship between the reference portion Ps_x and the mass point Ga_x observed from the Y-axis direction will be supplementarily described. The position of the reference portion Ps_x corresponds to the position of the vehicle system total center of gravity in the case where it is assumed that the occupant mounting (sitting) on the occupant mounting section 5 is motionless in a predetermined neutral posture relative to the occupant mounting section 5. In this case, therefore, the position of the mass point Ga_x agrees with the position of the reference portion Ps_x. The same applies to the positional relationship between the reference portion Ps_y and the mass point Ga_y observed from the X-axis direction.

In practice, however, when the occupant on the occupant mounting section 5 moves his/her upper body or the like relative to the occupant mounting section 5 (or the base body 2), the positions of the actual vehicle system total center of gravity in the X-axis direction and the Y-axis direction will usually shift from the positions of the reference portions Ps_x and Ps_y, respectively, in the horizontal direction. For this reason, the positions of the mass points Ga_x and Ga_y, which are shown in FIG. 5, are shifted from the positions of the reference portions Ps_x and Ps_y, respectively.

The behavior of the vehicle system total center of gravity represented by the inverted pendulum model described above is denoted by the following expressions (1a), (1b), (2a) and (2b). In this case, expressions (1a) and (1b) denote the behaviors observed in the Y-axis direction, while expressions (2a) and (2b) denote the behaviors observed in the X-axis direction.

$$Vb\_x = Vw1\_x + h \cdot \omega b\_x \quad (1a)$$

$$dVb\_x/dt = (g/h) \cdot (\theta b\_x \cdot (h - r\_x) + Ofst\_x) + \omega \cdot Vb\_y \quad (1b)$$

$$Vb\_y = Vw1\_y + h \cdot \omega b\_y \quad (2a)$$

$$dVb\_y/dt = (g/h) \cdot (\theta b\_y \cdot (h - r\_y) + Ofst\_y) - \omega z \cdot Vb\_x \quad (2b)$$

where Vb_x denotes the velocity of the vehicle system total center of gravity in the X-axis direction (the translational velocity); Vw1_y denotes the moving velocity of the virtual wheel 61_x in the X-axis direction (the translational velocity); θb_x denotes the tilt angle of the occupant mounting section 5 (or the base body 2) in the direction about the Y-axis; ωb_x denotes the temporal change rate of θb_x (=dθb_x/dt); Ofst_x denotes the amount of an offset of the position of the vehicle system total center of gravity in the X-axis direction (the position of the mass point Ga_x in the X-axis direction) from the position of the reference portion Ps_x in the X-axis direction; Vb_y denotes the velocity of the vehicle system total center of gravity in the Y-axis direction (the translational velocity); Vw1_y denotes the moving velocity of the virtual wheel 61_y in the Y-axis direction (the translational velocity); θb_y denotes the tilt angle of the occupant mounting section 5 (or the base body 2) in the direction about the X-axis; and ωb_y denotes the temporal change rate of θb_y (=dθb_y/dt); and Ofst_y denotes the amount of offset of the position of the vehicle system total center of gravity in the Y-axis direction (the position of the mass point Ga_y in the Y-axis direction) from the position of the reference portion Ps_y in the Y-axis direction. Further, ωz denotes a yaw rate (the angular velocity in the direction about the yaw axis) when the vehicle 1 turns, and g denotes a gravitational acceleration constant. The positive direction of θb_x and ωb_x is the direction in which the vehicle system total center of gravity tilts in the positive direction of the X-axis (forward), while the positive direction of θb_y and ωb_y is the direction in which the vehicle system total center of gravity tilts in the positive direction of the Y-axis (leftward). Further, the positive direction of ωz is the counterclockwise direction as the vehicle 1 is observed from above.

The second term of the right side of expression (1a), namely, (=h·ωb_x), denotes the translational velocity component of the reference portion Ps_x in the X-axis direction generated by a tilt of the occupant mounting section 5 in the direction about the Y-axis. The second term of the right side of expression (2a), namely, (=h·ωb_y), denotes the translational velocity component of the reference portion Ps_y in the Y-axis direction generated by a tilt of the occupant mounting section 5 in the direction about the X-axis.

Supplementarily, Vw1_x in expression (1a) specifically denotes a relative circumferential velocity of the virtual wheel 61_x with respect to the rod 62_x (in other words, with respect to the occupant mounting section 5 or the base body 2). Hence, Vw1_x includes a velocity component (=r_x·ωb_x), which is generated when the rod 62_x tilts, in addition to the moving velocity of the ground contact point of the virtual wheel 61_x in the X-axis direction relative to the floor surface, i.e., the moving velocity of the ground contact point of the traveling motion unit 3 in the X-axis direction relative to the floor surface. The same applies to Vw1_y in expression (1b).

Further, the first term of the right side of expression (1b) denotes an acceleration component in the X-axis direction generated at the vehicle system total center of gravity by a component in the X-axis direction (F_x in FIG. 5) of a floor reaction force (F in FIG. 5) acting on the ground contact portion of the virtual wheel 61_x according to the amount of offset (=θb_x·(h−r_x)+Ofst_x) of the position of the vehicle system total center of gravity in the X-axis direction (the position of the mass point Ga_x in the X-axis direction) from the vertical upper position of the ground contact portion of the virtual wheel 61_x (the ground contact portion of the traveling motion unit 3 observed from the Y-axis direction). The second term of the right side of expression (1b) denotes the acceleration component in the X-axis direction generated by a centrifugal force acting on the vehicle 1 at the time of turning at the yaw rate of ωz.

Similarly, the first term of the right side of expression (2b) denotes an acceleration component in the Y-axis direction generated at the vehicle system total center of gravity by a component in the Y-axis direction (F y in FIG. 5) of a floor reaction force (F in FIG. 5) acting on the ground contact portion of the virtual wheel 61_y according to the amount of offset (=θb_y·(h−r_y)+Ofst_y) of the position of the vehicle system total center of gravity in the Y-axis direction (the position of the mass point Ga_y in the Y-axis direction) from the vertical upper position of the ground contact portion of the virtual wheel 61_y (the ground contact portion of the traveling motion unit 3 observed from the X-axis direction). The second term of the right side of expression (2b) denotes the acceleration component in the Y-axis direction generated by a centrifugal force acting on the vehicle 1 at the time of turning at the yaw rate of ωz.

Figure 6:
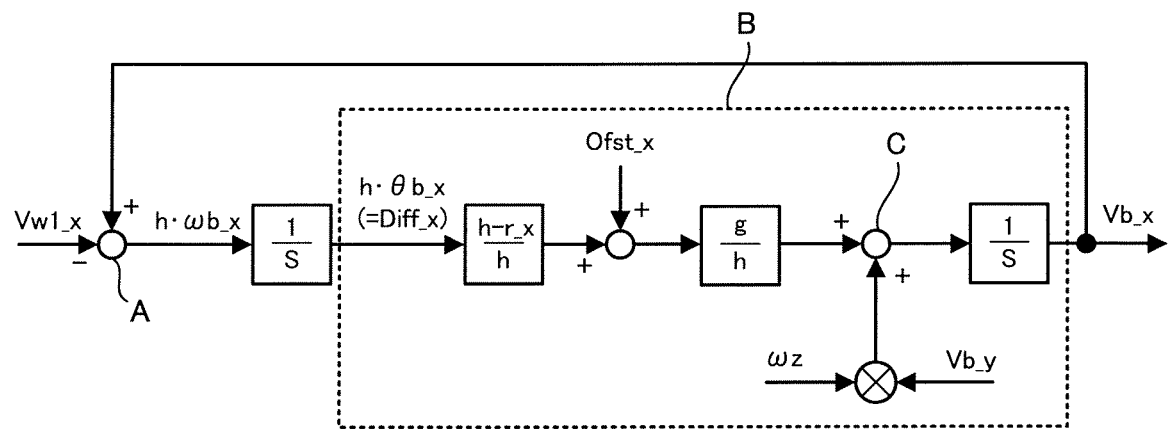
FIG. 6 is a block diagram illustrating behaviors related to the inverted pendulum model shown in FIG. 5.

The behaviors (the behaviors observed in the X-axis direction) represented by expressions (1a) and (1b) described above are illustrated by the block diagram of FIG. 6. In the diagram, 1/s denotes integration operation.

Further, the processing by an arithmetic unit indicated by reference character A in FIG. 6 corresponds to the relational expression of expression (1a), while the processing by an arithmetic unit indicated by reference character B corresponds to the relational expression of expression (1b).

Figure 5:
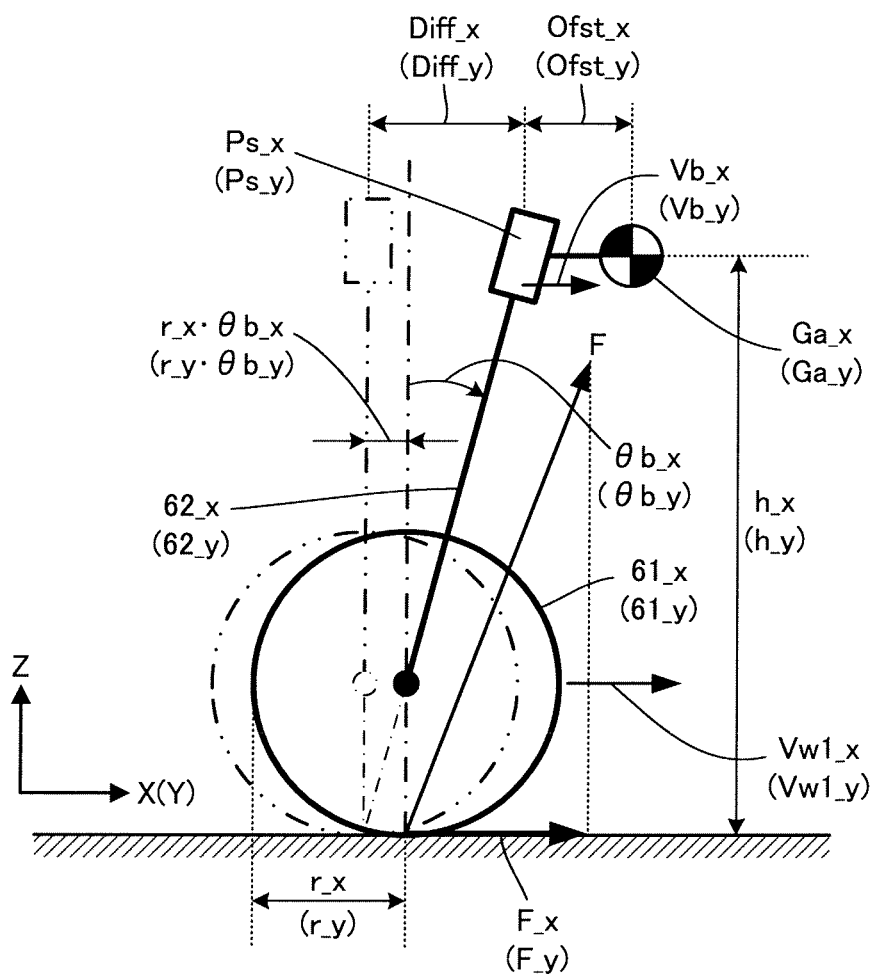
FIG. 5 is a diagram illustrating an inverted pendulum mode used for the processing by the first control processor shown in FIG. 3.

In FIG. 6, $h \cdot \theta b\_x$ approximately coincides with Diff_x shown in FIG. 5.

Meanwhile, the block diagram representing the behaviors indicated by expressions (2a) and (2b), i.e., the behaviors observed in the Y-axis direction, is obtained by replacing the suffix "_x" in FIG. 6 by "_y" and by replacing the sign "+" of the acceleration component (the acceleration component generated by the centrifugal force) at the lower side in the drawing, which is one of the inputs to an adder denoted by reference character C, by "−."

According to the present embodiment, the algorithm of the processing by the first control unit 24 is created on the basis of the behavior model (inverted pendulum model) of the vehicle system total center of gravity that considers the centrifugal force and the amount of the offset of the vehicle system total center of gravity from the reference portions Ps_x and Ps_y, as described above.

Based on the above, the processing by the first control unit 24 will be specifically described. In the following description, the set of the value of a variable related to the behavior observed from the Y-axis direction and the value of a variable related to the behavior observed from the X-axis direction will be denoted by adding a suffix "_xy" in some cases.

Referring to FIG. 4, the first control unit 24 first carries out the processing by the operation command generating unit 31 and the processing by the center-of-gravity velocity estimator 33 at each arithmetic processing cycle of the controller 21.

Figure 7:
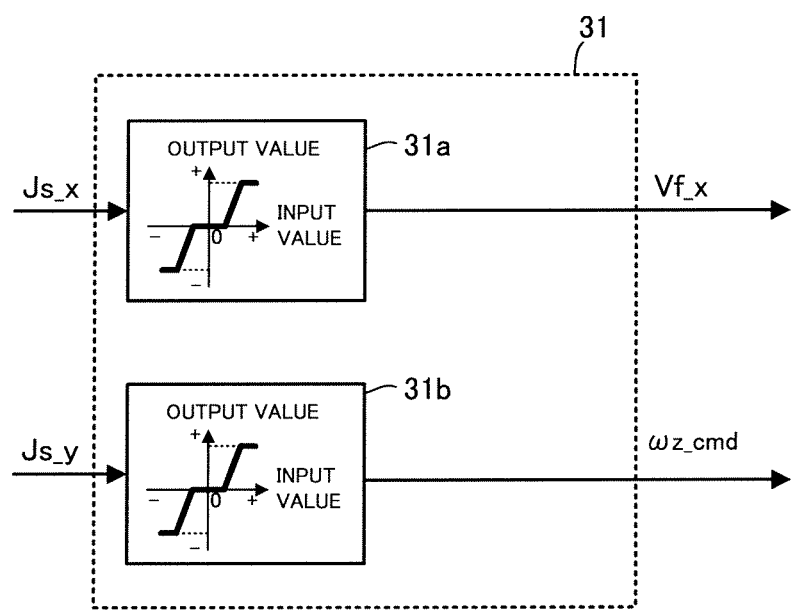
FIG. 7 is a block diagram illustrating the processing by an operation command generating unit shown in FIG. 4.

As illustrated in FIG. 7, the operation command generating unit 31 determines a basic velocity command Vf_x, which is the basic command value of the traveling velocity (the translational velocity) of the traveling motion unit 3 in the X-axis direction and a desired turn angular velocity ωz_cmd, which is the basic command value of the angular velocity in the direction about the yaw axis when the vehicle 1 turns, on the basis of the amount of swing of the joystick 12 in the X-axis direction (i.e., the amount of rotation about the Y-axis) Js_x and the amount of swing of the joystick 12 in the Y-axis direction (i.e., the amount of rotation about the X-axis) Js_y.

The basic velocity command Vf_x is determined by a processor 31a on the basis of the amount of swing of the joystick 12 in the X-axis direction Js_x. More specifically, if the amount of swing Js_x is an amount of swing in the positive direction (an amount of a forward swing), then the basic velocity command in the X-axis direction Vf_x will be a velocity command for a forward movement direction of the vehicle 1 (a positive velocity command). Further, if the amount of swing Js_x is an amount of swing in the negative direction (an amount of a backward swing), then the basic velocity command in the X-axis direction Vf_x will be a velocity command for a backward movement direction of the vehicle 1 (a negative velocity command). Further, in this case, the magnitude of the basic velocity command in the X-axis direction Vf_x is determined such that it increases to a predetermined upper limit value or less as the magnitude of the amount of swing of the joystick 12 in the X-axis direction (the forward or the backward direction) Js_x increases.

A predetermined range in which the magnitude of a swing amount of the joystick 12 in the positive direction or the negative direction Js_x is sufficiently small may be defined as a dead zone, and the basic velocity command in the X-axis direction Vf_x may be set to zero for a swing amount in the dead zone. The graph shown in the processor 31a in FIG. 7 indicates the relationship between an input (Js_x) and an output (Vf_x) in the case where the dead zone is involved.

In the present embodiment, the basic velocity command in the Y-axis direction Vf_y is set to zero.

Further, as illustrated in FIG. 7, the desired turn angular velocity ωz_cmd, which is the desired value of the angular velocity in the direction about the yaw axis when the vehicle 1 turns, is determined on the basis of the swing amount of the joystick 12 in the Y-axis direction Js_y by the processing carried out by a processor 31b. In this case, if the swing amount of the joystick 12 Js_y is a swing amount in the negative direction (the rightward swing amount), then the desired turn angular velocity ωz_cmd will be an angular velocity command of a right-hand (clockwise) turn, i.e., a negative angular velocity command. If the swing amount of the joystick 12 Js_y is a swing amount in the positive direction (leftward swing amount), then the desired turn angular velocity ωz_cmd will be an angular velocity command of a left-hand (counterclockwise) turn, i.e., a positive angular velocity command. In this case, the magnitude of the desired turn angular velocity ωz_cmd is determined such that it increases to a predetermined upper limit value or less as the magnitude of the swing amount of the joystick 12 in the Y-axis direction increases.

Alternatively, however, regarding the magnitude of the desired turn angular velocity ωz_cmd, a predetermined range in which the magnitude of a swing amount of the joystick 12 in the Y-axis direction is sufficiently small may be defined as a dead zone, and the desired turn angular velocity ωz_cmd may be set to zero in the case of a swing amount falling in the dead zone. The graph given in the processor 31b in FIG. 7 indicates the relationship between inputs (Js_y) and outputs (ωz_cmd) in the case where the dead zone is involved.

The center-of-gravity velocity estimator 33 calculates an estimated value of the velocity of the vehicle system total center of gravity Vb_estm1_xy according to the geometric (dynamic) relationship expressions given by the aforesaid expressions (1a) and (2a) in the inverted pendulum model.

More specifically, as illustrated by the block diagram in FIG. 4, the value of an actual translational velocity Vw1_act_xy of the traveling motion unit 3 and the value, which is obtained by multiplying an actual temporal change rate (tilt angular velocity) ωb_act_xy of a tilt angle θb_xy of the occupant mounting section 5 by a height h of the vehicle system total center of gravity are added up to calculate the estimated value of the velocity of the vehicle system total center of gravity Vb_estm1_xy.

More specifically, the estimated value of the velocity in the X-axis direction Vb_estm1_x of the vehicle system total center of gravity and the estimated value of the velocity in the Y-axis direction Vb_estm1_y thereof are calculated according to the following expressions (3a) and (3b).

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the offset amount Ofst_xy of the position of the vehicle system total center of gravity from the position of the reference portion Ps_xy (hereinafter referred to as the center-of-gravity offset amount Ofst_xy) is set to be sufficiently smaller than Vb_estm1_xy so as to be ignorable.

In this case, according to the present embodiment, desired values of the traveling velocity Vw1_cmd_x and Vw1_cmd_y (previous values) of the traveling motion unit 3 determined by the posture control arithmetic unit 34 at the previous arithmetic processing cycle are used as the values of Vw1_act_x and Vw1_act_y in the above calculation.

Alternatively, however, the rotational speeds of the electric motors 8a and 8b, for example, may be detected by a rotational velocity sensor, such as a rotary encoder. In this case, the latest values of Vw1_act_x and Vw1_act_y (i.e., the latest values of the measurement values of Vw1_act_x and Vw1_act_y) estimated from the detection values may be used for the calculation of expressions (3a) and (3b).

Further, according to the present embodiment, the latest values of the temporal change rates of the measurement values of the tilt angle θb of the occupant mounting section 5 based on a detection signal of the tilt sensor 22 (i.e., the latest values of the measurement values of ωb_act_x and ωb_act_y) are used as the values of ωb_act_x and ωb_act_y.

After carrying out the processing by the operation command generating unit 31 and the center-of-gravity velocity estimator 33 as described above, the first control unit 24 carries out the processing by a center-of-gravity offset estimator 35a illustrated in FIG. 4 so as to determine a center-of-gravity offset amount estimated value Ofst_estm_xy, which is the estimated value of the center-of-gravity offset amount Ofst_xy.

Figure 8:
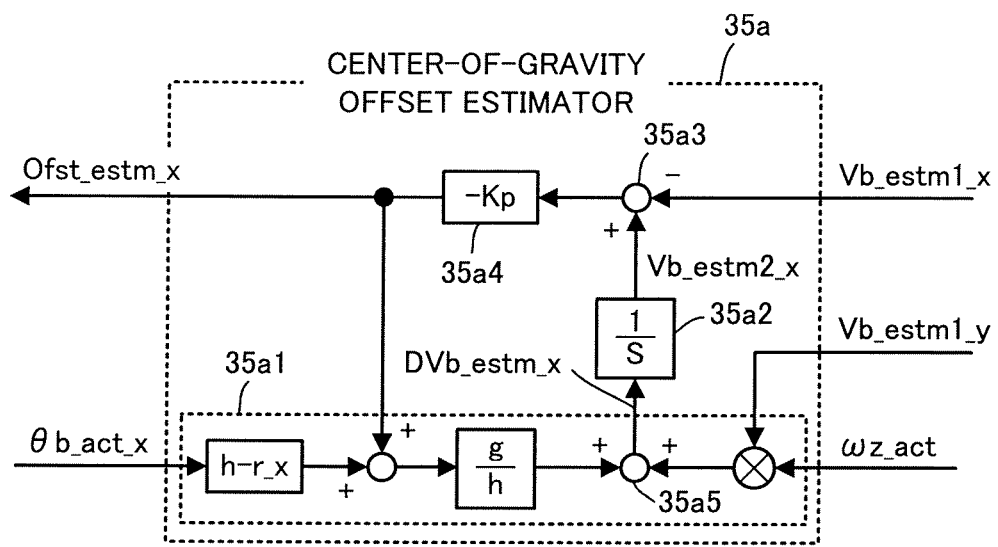
FIG. 8 is a block diagram illustrating the processing by a center-of-gravity offset estimator shown in FIG. 4.

The processing by the center-of-gravity offset estimator 35a is the processing indicated by the block diagram of FIG. 8. FIG. 8 representatively illustrates the processing for determining the estimated value of the center-of-gravity offset amount in the X-axis direction Ofst_estm_x of the estimated value of the center-of-gravity offset amount Ofst_estm_xy.

The processing in FIG. 8 will be specifically described. The center-of-gravity estimator 35a carries out the arithmetic processing of the right side of the aforesaid expression (1b) by an arithmetic unit 35a1 to calculate an estimated value of the translational acceleration of the vehicle system total center of gravity in the X-axis direction DVb_estm_x by using the measurement value (a latest value) of an actual tilt angle in the direction about the Y-axis θb_act_x of the occupant mounting section 5 obtained from a detection signal of the tilt sensor 22, the measurement value (a latest value) of an actual yaw rate ωz_act of the vehicle 1 obtained from a detection signal of the yaw rate sensor 23, a first estimated value (a latest value) of the velocity of the vehicle system total center of gravity in the Y-axis direction Vb_estm1_y calculated by the center-of-gravity velocity estimator 33, and the estimated value of the center-of-gravity offset amount in the X-axis direction Ofst_estm_x (a previous value) determined at the previous arithmetic processing cycle.

The center-of-gravity offset estimator 35a further carries out the processing for integrating the estimated value of the translational acceleration in the X-axis direction DVb_estm_x of the vehicle system total center of gravity by an arithmetic unit 35a2 thereby to calculate a second estimated value of the velocity of the vehicle system total center of gravity in the X-axis direction Vb_estm2_x.

Subsequently, the center-of-gravity offset estimator 35a carries out the processing for calculating the difference between the second estimated value of the velocity of the vehicle system total center of gravity in the X-axis direction Vb_estm2_x (a latest value) and the first estimated value Vb_estm1_x (a latest value) thereof by an arithmetic unit 35a3.

Then, the center-of-gravity offset estimator 35a further carries out the processing for multiplying the difference by a gain (−Kp) of a predetermined value by an arithmetic unit 35a4 so as to determine the latest value of the estimated value of the center-of-gravity offset amount in the X-axis direction Ofst_estm_x.

The processing for determining the estimated value of the center-of-gravity offset amount in the Y-axis direction Ofst_estm_y is also carried out in the same manner described above. More specifically, the block diagram illustrating the determination processing can be obtained by replacing the suffix "_x" in FIG. 8 by "y" and by replacing the sign "+" of the acceleration component (an acceleration component generated by a centrifugal force) at right in the drawing, which is one of the inputs to an adder 35a5 included in the arithmetic unit 35a1, by "−".

Sequentially updating the estimated value of the center-of-gravity offset amount Ofst_estm_xy by the aforesaid processing carried out by the center-of-gravity offset estimator 35a makes it possible to converge Ofst_estm_xy to an actual value.

The first control unit 24 then carries out the processing by a center-of-gravity offset influence amount calculator 35b shown in FIG. 4 to calculate a center-of-gravity offset influence amount Vofs_xy.

The center-of-gravity offset influence amount Vofs_xy indicates the deviation of an actual center-of-gravity velocity from a desired velocity of the vehicle system total center of gravity in the case where the feedback control is conducted in the posture control arithmetic unit 34, which will be discussed hereinafter, without considering the offset of the position of the vehicle system total center of gravity from the position of the reference portion Ps_xy in the inverted pendulum mode.

To be specific, the center-of-gravity offset influence amount calculator 35b multiplies each component of a newly determined estimated value of the center-of-gravity offset amount Ofst_estm_xy by a value denoted by (Kth_xy/(h−r_xy))/Kvb_xy, thereby calculating the center-of-gravity offset influence amount Vofs_xy.

Kth_xy denotes a gain value for determining a manipulated variable component which functions to bring the tilt angle of the occupant mounting section 5 close to a desired tilt angle, in the processing by the posture control arithmetic unit 34, which will be hereinafter discussed. Further, Kvb_xy denotes a gain value for determining a manipulated variable component which functions to bring the difference between a desired velocity with a compensated center-of-gravity offset Vb_cmpn_cmd_xy and the first estimated value of the velocity of the vehicle system total center of gravity Vb_estm1_xy close to zero in the processing carried out by the posture control arithmetic unit 34, which will be hereinafter discussed.

The first control unit 24 then carries out the processing by the center-of-gravity desired velocity determiner 32 shown in FIG. 4 so as to calculate a restricted center-of-gravity desired velocity Vb_cmd_xy on the basis of the basic velocity command Vf_x determined by the operation command generating unit 31 and the center-of-gravity offset influence amount Vofs_xy determined by the center-of-gravity offset influence amount calculator 35b.

The center-of-gravity desired velocity determiner 32 first carries out the processing through a processor 32c shown in FIG. 4. The processor 32c carries out dead-zone processing and limiting related to the value of the center-of-gravity offset influence amount Vofs_xy thereby to determine a desired center-of-gravity velocity additive amount Vb_cmd_by_ofs_xy as a component based on the center-of-gravity offset of a desired value of the vehicle system total center of gravity.

More specifically, according to the present embodiment, if the magnitude of the center-of-gravity offset influence amount in the X-axis direction Vofs_x is a value within a dead zone, which is a predetermined range in the vicinity of zero, i.e., a value that is relatively close to zero, then the center-ofgravity desired velocity determiner 32 sets the desired center-of-gravity velocity additive amount in the X-axis direction Vb_cmd_by_ofs_x to zero.

Further, if the magnitude of the center-of-gravity offset influence amount in the X-axis direction Vofs_x is a value that deviates from the dead zone, then the center-of-gravity desired velocity determiner 32 determines the desired center-of-gravity velocity additive amount in the X-axis direction Vb_cmd_by_ofs_x such that the polarity thereof is the same as Vofs_x and the magnitude thereof increases as the magnitude of Vofs_x increases. However, the value of the desired center-of-gravity velocity additive amount Vb_cmd_by_ofs_x is restricted to the range from a predetermined upper limit value (>0) to a predetermined lower limit value (0).

The processing for determining the desired center-of-gravity velocity additive amount in the Y-axis direction Vb_cmd_by_ofs_y is the same as the processing described above.

Subsequently, the center-of-gravity desired velocity determiner 32 carries out, by a processor 32d shown in FIG. 4, the processing for determining a desired velocity V1_xy obtained by adding the desired center-of-gravity velocity additive amount Vb_cmd_by_ofs_xy to the basic velocity command Vf_x determined by the operation command generating unit 31. More specifically, the center-of-gravity desired velocity determiner 32 determines V1_xy (a set of V1_x and V1_y) by the processing denoted by V1_x=Vf_x+Vb_cmd_by_ofs_x and V1_y=Vf_y+Vb_cmd_by_ofs_y.

Further, the center-of-gravity desired velocity determiner 32 carries out the processing by a processor 32e. The processor 32e carries out limiting for determining a restricted center-of-gravity desired velocity Vb_cmd_xy (a set of Vb_cmd_x and Vb_cmd_y) as a desired velocity of the vehicle system total center of gravity obtained by restricting the combination of desired velocities V1_x and V1_y in order to prevent the rotational speed of each of the electric motors 8a and 8b constituting the actuator 8 of the traveling motion unit 3 from deviating from a predetermined permissible range.

In this case, if the set of the desired velocities V1_x and V1_y determined by the processor 32d lies within a predetermined region (e.g., an octagonal region) on a coordinate system, in which the axis of ordinate indicates the value of the desired velocity V1_x and the axis of abscissa indicates the value of the desired velocity V1_y, then the desired velocity V1_xy is determined directly as the restricted center-of-gravity desired velocity Vb_cmd_xy.

Further, if the set of the desired velocities V1_x and V1_y determined by the processor 32d deviates from the predetermined region on the coordinate system, then a set that has been restricted to lie on the boundary of the predetermined region is determined as the restricted center-of-gravity desired velocity Vb_cmd_xy.

The center-of-gravity desired velocity Vb_cmd_xy is determined on the basis of the basic velocity command Vf_x and the center-of-gravity offset influence amount Vofs_xy (or the center-of-gravity offset) as described above. This enables the occupant to maneuver the vehicle 1 by operating the joystick 12, and by changing the posture of his/her body, i.e., by shifting his/her weight.

After carrying out the processing by the center-of-gravity desired velocity determiner 32, the first control unit 24 carries out the processing by the posture control arithmetic unit 34. The posture control arithmetic unit 34 carries out the processing illustrated by the block diagram of FIG. 4 to determine a desired translational velocity Vw1_cmd_xy, which is the desired value of the traveling velocity (translational velocity) of the traveling motion unit 3.

More specifically, the posture control arithmetic unit 34 first carries out, by the arithmetic unit 34b, the processing for subtracting each component of the center-of-gravity offset influence amount Vofs_xy from each component of the restricted center-of-gravity desired velocity Vb_cmd_xy, thereby determining a desired velocity with a compensated center-of-gravity offset Vb_cmpn_cmd_xy (a latest value).

Subsequently, according to expressions (4a) and (4b) given below, the posture control arithmetic unit 34 calculates a desired translational acceleration in the X-axis direction DVw1_cmd_x and a desired translational acceleration in the Y-axis direction DVw1_cmd_y of a desired translational acceleration DVw1_cmd_xy, which is the desired value of the translational acceleration at the ground contact point of the traveling motion unit 3, by carrying out the processing through the arithmetic units except for the arithmetic unit 34b and an integral arithmetic unit 34a, which carries out integral operations.

$$DVw1\_cmd\_x = Kvb\_x \cdot (Vb\_cmpn\_cmd\_x - Vb\_estm1\_x) + \qquad (4a)$$
$$Kth\_x \cdot (\theta b\_cmd\_x - \theta b\_act\_x) - Kw\_x \cdot \omega b\_act\_x$$

$$DVw1\_cmd\_y = Kvb\_y \cdot (Vb\_cmpn\_cmd\_y - Vb\_estm1\_y) + \qquad (4b)$$
$$Kth\_y \cdot (\theta b\_cmd\_y - \theta b\_act\_y) - Kw\_x \cdot \omega b\_act\_y$$

In expressions (4a) and (4b), Kvb_xy, Kth_xy and Kw_xy denote predetermined gain values set beforehand. The desired tilt angle in the direction about the Y-axis θb_cmd_x of the occupant mounting section 5 is constantly set to zero.

Figure 9:
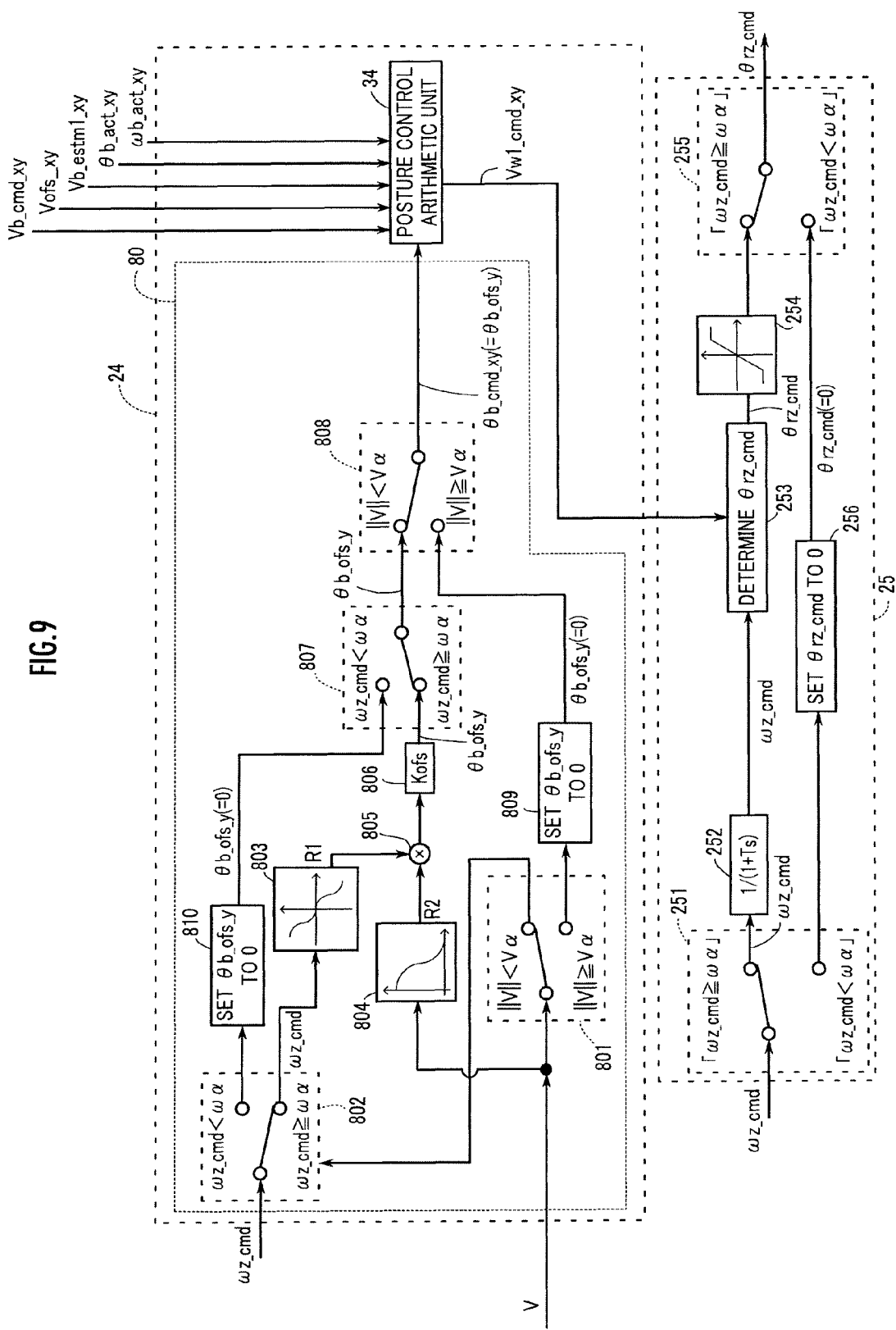
FIG. 9 is a block diagram illustrating the control processing by the first control unit and the second control unit, in a state where a turning command is being output.

Further, the desired tilt angle in the direction about the X-axis θb_cmd_y of the occupant mounting section 5 is set to zero in a case where the controller 21 controls the vehicle 1 so as to perform translational movement (in a case where the turning command is not output from the joystick 12, that is, when the desired turn angular velocity ωz_cmd determined by the operation command generating unit 31 is zero), and is set to a value for appropriately performing turning as will be explained later, in a case where the controller 21 controls the vehicle 1 so as to perform turning (in a case where the turning command is output from the joystick 12, that is, in a case where the desired turn angular velocity ωz_cmd determined by the operation command generating unit 31 is not zero) (refer to FIG. 9).

The first term of the right side of expression (4a) denotes a feedback manipulated variable component based on the difference between the compensated center-of-gravity-offset desired velocity in the X-axis direction Vb_cmpn_cmd_x (a latest value) of the vehicle system total center of gravity and a first estimated value Vb_estm1_x (a latest value). Further, the second term of the right side of expression (4a) denotes a feedback manipulated variable component based on a deviation between a desired tilt angle in the direction about the Y-axis θb_cmd_x (a latest value) of the occupant mounting section 5 and a measurement value (a latest value) of an actual tilt angle θb_act_x thereof. Further, the third term of the right side of expression (4a) denotes a feedback manipulated variable component based on a measurement value (a latest value) of an actual tilt angular velocity in the direction about the Y-axis ωb_act_x of the occupant mounting section 5. Further, a desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the compensated center-of-gravity-offset desired velocity in the Y-axis direction Vb_cmpn_c_md_y (a latest value) of the vehicle system total center of gravity and a first estimated value Vb_estm1_y (a latest value). Further, the second term of the right side of expression (4b) denotes a feedback manipulated variable component based on a deviation between the desired tilt angle in the direction about the X-axis θb_cmd_y (a latest value) of the occupant mounting section 5 and a measurement value (a latest value) of an actual tilt angle in the direction about the X-axis θb_act_y thereof. Further, the third term of the right side of expression (4b) denotes a feedback manipulated variable component based on a measurement value (a latest value) of an actual tilt angular velocity in the direction about the X-axis ωb_act_y of the occupant mounting section 5. Further, a desired translational acceleration in the Y-axis direction DVw1_cmd_y is calculated as a resultant manipulated variable of the above feedback manipulated variable components.

Subsequently, the posture control arithmetic unit 34 integrates the components of the desired translational acceleration DVw1_cmd_xy by the integral arithmetic unit 34a, thereby determining a desired translational velocity Vw1_cmd_xy (a latest value) of the traveling motion unit 3.

Then, the first control unit 24 controls the electric motors 8a and 8b constituting the actuator 8 of the traveling motion unit 3 according to the desired translational velocity Vw1_cmd_xy determined as described above. More specifically, the first control unit 24 determines the current command values for the electric motors 8a and 8b by feedback control processing so as to make the actual rotational velocities (measurement values) of the electric motors 8a and 8b follow the desired values of the rotational velocities thereof specified by the desired translational velocity Vw1_cmd_xy determined as described above. The first control unit 24 then energizes the electric motors 8a and 8b according to the current command values.

In a state wherein the restricted center-of-gravity desired velocity Vb_cmd_xy remains at a fixed value and the motion of the vehicle 1 has been stabilized, and the vehicle 1 is traveling in a straight line at a fixed velocity by the above-explained processing, the vehicle system total center of gravity lies right above the ground contact point of the traveling motion unit 3. In this state, the actual tilt angle θb_act_xy of the occupant mounting section 5 will be −Ofst_xy/(h−r_xy) according to expressions (1b) and (2b). The actual tilt angular velocity ωb_act_xy of the occupant mounting section 5 will be zero and the desired translational acceleration DVw1_cmd_xy will be zero. This combined with the block diagram of FIG. 4 lead to the finding of the agreement between Vb_estm1_xy and Vb_cmd_xy.

In other words, the desired translational velocity Vw1_cmd_xy of the traveling motion unit 3 is basically determined to converge the difference between the restricted center-of-gravity desired velocity Vb_cmd_xy of the vehicle system total center of gravity and the first estimated value Vb_estm1_xy to zero.

Further, the rotational speeds of the electric motors 8a and 8b constituting the actuator 8 of the traveling motion unit 3 are controlled so as not to deviate from a predetermined permissible range by the processing carried out by the processor 32e while compensating for the influence on the deviation of the position of the vehicle system total center of gravity from the position of the reference portion Ps_xy in the inverted pendulum model.

This completes the detailed description of the processing by the first control unit 24 in the present embodiment.

Further, when the controller 21 controls the vehicle 1 so as to perform translational movement, the second control unit 25 controls the steering angle of the wheel 4, such that the rolling direction of the wheel 4 coincides with the moving direction of the traveling motion unit 3. Specifically, the second control unit 25 determines an angle of the rolling direction of the wheel 4 with respect to the longitudinal direction of the vehicle 1 (moving direction of the traveling motion unit 3), that is, the desired steering angle θrz_cmd, by applying an arctangent function to a value obtained by dividing the desired translational velocity in the Y-axis direction Vw1_cmd_y by the desired translational velocity in the X-axis direction Vw1_cmd_x, as is shown in following expression (5).

$$\theta rz\_cmd = \tan^{-1}(Vw1\_cmd\_y/Vw1\_cmd\_x) \quad (5)$$

Then, the second control unit 25 controls the electric motor 14, so that the actual steering angle θrz_act of the wheel 4 becomes the desired steering angle θrz_cmd thus determined.

Next, with reference to FIG. 9 and FIG. 10, processing by the first control unit 24 and the second control unit 25 in a case where the turning command is output from the joystick 12, that is, in a case where the desired turn angular velocity ωz_cmd determined by the operation command generating unit 31 is not zero, will be explained.

In a case where the turning command is being output, the first control unit 24 sets the desired tilt angle in the direction about the X-axis θb_cmd_y of the occupant mounting section 5 with the desired tilt angle setting unit 80. At this time, as is explained above, the first control unit 24 sets the desired tilt angle in the direction about the Y-axis θb_cmd_x of the occupant mounting section 5 to zero, as is in the case where the controller 21 controls the vehicle 1 so as to perform translational movement. Then, the desired translational velocity Vw1_cmd_xy of the traveling motion unit 3 is set using the desired tilt angle θb_cmd_xy thus determined, with the posture control arithmetic unit 34 as is explained above. The processing is identical to the processing of the posture control arithmetic unit 34 in the case where the controller 21 controls the vehicle 1 so as to perform translational movement, except for the value of the desired tilt angle in the direction about the X-axis θb_cmd_y of the occupant mounting section 5.

That is, the processing by the first control unit 24 in the case where the turning command is being output is, compared to the processing by the first control unit 24 in the case where the turning command is not being output (in the case where the vehicle 1 performs translational movement), differs only in the point that the desired tilt angle in the direction about the X-axis θb_cmd_y of the occupant mounting section 5 is not set constantly to zero.

Further, in the case where the turning command is being output, the second control unit 25 determines the desired steering angle θrz_cmd (refer to FIG. 10), mainly according to the desired turn angular velocity ωz_cmd and the desired translational velocity Vw1_cmd_xy.

At this time, when the turning command is being output from the joystick 12, the second control unit 25 determines the desired steering angle θrz_cmd so that the rolling direction R of the wheel 4 becomes the state changed with respect to the direction of the moving velocity vector V of the traveling motion unit 3, by controlling the steering of the wheel 4 in the yaw direction.

Therefore, in this state, when the first control unit 24 controls the first actuator 8 according to the desired translational velocity Vw1_cmd_xy of the traveling motion unit 3 determined as is explained above, so as to make the traveling motion unit 3 move, the vehicle 1 may turn smoothly, by the control of the second control unit 25 to steer the wheel 4 so that the steering angle becomes the desired steering angle θrz_cmd. At this time, the rolling direction R of the wheel 4 is changed with respect to the moving direction of the traveling motion unit 3 (the direction of the moving velocity vector V), so that the occupant may turn the vehicle 1 easily, without requiring skillful maneuvering technique and the like of the occupant.

Hereinafter, the details of the processing by the first control unit 24 and the second control unit 25 in the case where the turning command is being output from the joystick 12 will be explained.

First, the details of the processing by the first control unit 24 will be explained with reference to FIG. 9. In the case where the turning command is being output, the first control unit 24 sets the desired tilt angle θb_cmd_xy from the processing by the desired tilt angle setting unit 80. The desired tilt angle setting unit 80 is equipped with a first process unit 801 through a tenth process unit 810.

The desired tilt angle setting unit 80 sets a tilt angle offset θb_ofs_y (the details will be explained later) to zero by the first process unit 801, the eighth process unit 808, and the ninth process unit 809, when "a magnitude of the current moving velocity vector V of the traveling motion unit 3 (a norm ||V|| of the vector V) is a magnitude equal to or larger than a predetermined value Vα (the details will be explained later)". In the present embodiment, a previous value of the desired translational velocity Vw1_cmd_xy(k−1) is used as the current moving velocity vector V of the traveling motion unit 3. The previous value of the desired translational velocity Vw1_cmd_xy(k−1) denotes a velocity set as the desired translational velocity Vw1_cmd_xy in a previous arithmetic processing cycle. As is explained above, in the present embodiment, the previous value of the desired translational velocity Vw1_cmd_xy(k−1) is used as a vector approximating the moving velocity vector V of the traveling motion unit 3.

Further, when "a magnitude of the desired turn angular velocity ωz_cmd is a magnitude smaller than a predetermined value ωa" and also when "a magnitude of the current moving velocity vector V is a magnitude smaller than the predetermined value Vα", the desired tilt angle setting unit 80 sets the tilt angle offset θb_ofs_y to zero by the second process unit 802, the seventh process unit 807, the eighth process unit 808, and the tenth process unit 810.

Further, when "the magnitude of the desired turn angular velocity ωz_cmd is the magnitude equal to or larger than the predetermined value ωa" and also when "the magnitude of the current moving velocity vector V is the magnitude smaller than the predetermined value Vα", the desired tilt angle setting unit 80 sets the tilt angle offset θb_ofs_y according to the desired turn angular velocity ωz_cmd and the current moving velocity vector V, by the first process unit 801 through the eighth process unit 808. Hereinafter, the details of the processing by the desired tilt angle setting unit 80 will be explained.

The desired tilt angle setting unit 80 determines whether or not the magnitude of the current moving velocity vector V is the magnitude equal to or larger than the predetermined value Vα by the first process unit 801. The predetermined value Vα is set to a velocity in which the vehicle 1 is capable of performing turning smoothly. In the present embodiment, the predetermined value Vα is for example set to 0.05[m/s]. In the present embodiment, the state where the traveling motion unit 3 is traveling at a speed smaller than the predetermined value Vα is defined as a semi-travel stopped state, and the state where the traveling motion unit 3 is stopped is defined as a stopped state.

In the case where it is determined by the first process unit 801 that the magnitude of the current moving velocity vector V is the magnitude smaller than the predetermined value Vα, then it is determined whether or not the magnitude of the desired turn angular velocity ωz_cmd is equal to or larger than the predetermined value ωa by the second process unit 802. The predetermined value ωa is set to an angular velocity which is capable of being assumed that the turning command is actually output to the vehicle 1 by the operation of the joystick 12. In the present embodiment, ωa is for example set to 1.0[rad/s].

That is, in the present embodiment, the state where the magnitude of the desired turn angular velocity ωz_cmd determined according to a swinging operation of the joystick 12 in the Y-axis direction (lateral direction) is the magnitude equal to or larger than the predetermined value ωa corresponds to a state where the turn request of the vehicle 1 is substantially present. Further, the state where ωz_cmd becomes smaller than the predetermined value ωa corresponds to a state where the turn request of the vehicle 1 is substantially not present.

In the case where it is determined by the second process unit 802 that the magnitude of the desired turn angular velocity ωz_cmd is the magnitude equal to or larger than the predetermined value ωa, the third process unit 803 sets a first ratio R1 according to the desired turn angular velocity ωz_cmd. The third process unit 803 sets the first ratio R1 to be larger as the magnitude of the desired turn angular velocity ωz_cmd becomes larger. A maximum value of an absolute value of the first ratio R1 is set to 1, and a minimum value (when the magnitude of the desired turn angular velocity ωz_cmd is zero) is set to zero. Further, in the case where the desired turn angular velocity ωz_cmd is a positive value, the first ratio R1 is set to a negative value. Further, in the case where the desired turn angular velocity ωz_cmd is a negative value, the first ratio R1 is set to a positive value.

Further, at this time, the fourth process unit 804 sets a second ratio R2 so as to approach the desired tilt angle θb_cmd_xy in a situation where the turning command is not output from the joystick 12 and also in a situation where the traveling motion unit 3 is stopped, that is, so as to approach zero, as the magnitude of the current moving velocity vector V becomes larger (stated otherwise, it is set so that the second ratio R2 becomes larger as the magnitude of the current moving velocity vector V becomes smaller). A maximum value (when the magnitude of the current moving velocity vector V is zero) of the second ratio R2 is set to 1, and a minimum value (when the magnitude of the current moving velocity vector V is the predetermined value Vα) is set to zero. Thereafter, the fifth process unit 805 multiplies the first ratio R1 set by the third process unit 803 and the second ratio R2 set by the fourth process unit 804. Thereafter, the sixth process unit 806 multiplies the value obtained as a result of multiplication by the fifth process unit 805 with a predetermined gain Kofs, so as to obtain the tilt angle offset θb_ofs_y. The tilt angle offset θb_ofs_y represents the tilt angle in the direction about the X-axis of the occupant mounting section 5 necessary for turning the vehicle 1 smoothly, when the turning command is output from the joystick 12.

Thereafter, in the case where the magnitude of the desired turn angular velocity ωz_cmd is the magnitude equal to or larger than the predetermined value ωa, the seventh process unit 807 outputs the tilt angle offset θb_ofs_y output from the sixth process unit 806, and in the case where the magnitude of the desired turn angular velocity ωz_cmd is the magnitude smaller than the predetermined value ωa, the seventh process unit 807 outputs the tilt angle offset θb_ofs_y output from the tenth process unit 810 explained hereinafter.

In the case where the magnitude of the current moving velocity vector V is the magnitude smaller than the predetermined value Vα, the eighth process unit 808 outputs the tilt angle offset θb_ofs_y output by the seventh process unit 807, and in the case where the magnitude of the current moving velocity vector V is the magnitude equal to or larger than the predetermined value Vα, the eighth process unit 808 outputs the tilt angle offset θb_ofs_y output by the ninth process unit 809 explained hereinafter.

In the case where it is determined by the first process unit 801 that the magnitude of the current moving velocity vector V is the magnitude equal to or larger than the predetermined value Vα, the ninth process unit 809 sets the tilt angle offset θb_ofs_y to zero. Further, the eighth process unit 808 outputs zero as the tilt angle offset θb_ofs_y. Further, in the case where it is determined by the second process unit 802 that the magnitude of the desired turn angular velocity ωz_cmd is the magnitude smaller than the predetermined value ωa, the tenth process unit 810 sets the tilt angle offset θb_ofs_y to zero. Further, the seventh process unit 807 outputs zero as the tilt angle offset θb_ofs_y. Thereafter, the tilt angle offset θb_ofs_y output from the eighth process unit 808 is output from the desired tilt angle setting unit 80 as the desired tilt angle θb_cmd_xy.

To summarize the above-explained points, the desired tilt angle setting unit 80 outputs the desired tilt angle θb_cmd_xy obtained by multiplying all of the first ratio R1, the second ratio R2, and the predetermined gain Kofs, when "the magnitude of the current moving velocity vector V is the magnitude smaller than the predetermined value Vα", and also when "the magnitude of the desired turn angular velocity ωz_cmd is the magnitude equal to or larger than the predetermined value ωa".

Further, the desired tilt angle setting unit 80 outputs zero as the desired tilt angle θb_cmd_xy, when "the magnitude of the current moving velocity vector V is the magnitude smaller than the predetermined value Vα", and also when "the magnitude of the desired turn angular velocity ωz_cmd is the magnitude smaller than the predetermined value ωa".

Further, the desired tilt angle setting unit 80 also outputs zero as the desired tilt angle θb_cmd_xy, when "the magnitude of the current moving velocity vector V is the magnitude equal to or larger than the predetermined value Vα".

The above is the details of the processing by the desired tilt angle setting unit 80 in the present embodiment. The desired tilt angle θb_cmd_xy output from the desired tilt angle setting unit 80 is input to the posture control arithmetic unit 34 of the first control unit 24 explained above. At this time, the posture control arithmetic unit 34 is input with, in addition to the desired tilt angle θb_cmd_xy, as is explained above, the desired velocity Vb_cmd_xy of the vehicle system total center of gravity, the center of gravity offset influence amount Vofs_xy, the velocity of the vehicle system total center of gravity Vb_estm1_xy estimated by the center-of-gravity velocity estimator 33, the actual tilt angle θb_act_xy of the occupant mounting section 5, and the actual tilt angular velocity ωb_act_xy of the tilt angle θb_xy of the occupant mounting section 5. The posture control arithmetic unit 34 determines the desired translational velocity Vw1_cmd_xy, on the basis of these inputs, by integrating the results obtained by expression 4(a) and expression (4b).

The desired translational velocity Vw1_cmd_xy determined in this case, is determined on the basis of the desired tilt angle θb_cmd_xy reflecting the tilt angle offset θb_ofs_y set from the processing by the desired tilt angle setting unit 80. By doing so, the desired translational velocity Vw1_cmd_xy is set to a value in which the vehicle 1 is capable of turning smoothly according to the turning command.

Next, the details of the processing by the second control unit 25 in the case where the turning command is being output from the joystick 12 will be explained with reference to FIG. 9. The second control unit 25 is equipped with a first process unit 251 through a sixth process unit 256. The second control unit 25 outputs, with the processing by the first process unit 251 and the fifth process unit 255, the desired steering angle θrz_cmd determined by the second process unit 252 through the fourth process unit 254 in the case where the magnitude of the desired turn angular velocity ωz_cmd is the magnitude equal to or larger than the predetermined value ωa, and outputs the desired steering angle θrz_cmd determined by the sixth process unit 256 in the case where the desired turn angular velocity ωz_cmd is smaller than the predetermined value ωa.

First, the processing by the second control unit 25 when the magnitude of the desired turn angular velocity ωz_cmd is the magnitude equal to or larger than the predetermined value ωa will be explained. In this case, the desired turn angular velocity ωz_cmd performed with a filtering processing of a low-pass characteristics with a transfer function represented by "1/(1+Ts)" is output from the second process unit 252.

Thereafter, the third process unit 253 determines the desired steering angle θrz_cmd of the wheel 4, according to expression (6b) obtained on the basis of the following expression (6a) expressing a geometry model (a kinematics model) representing a rotational behavior of the vehicle 1 in the yaw direction according to the steering of the wheel 4.

$$-A + B \cdot \tan(\theta rz) = 0 \tag{6a}$$

where $$A = Vw1\_y \cdot \Delta t - L \cdot \sin(\omega z \cdot \Delta t) \tag{6a1}$$

$$B = Vw1\_x \cdot \Delta t - L \cdot \cos(\omega z \cdot \Delta t) + L \tag{6a2}$$

$$\theta rz = \tan^{-1}(A/B) \tag{6b}$$

Figure 10:
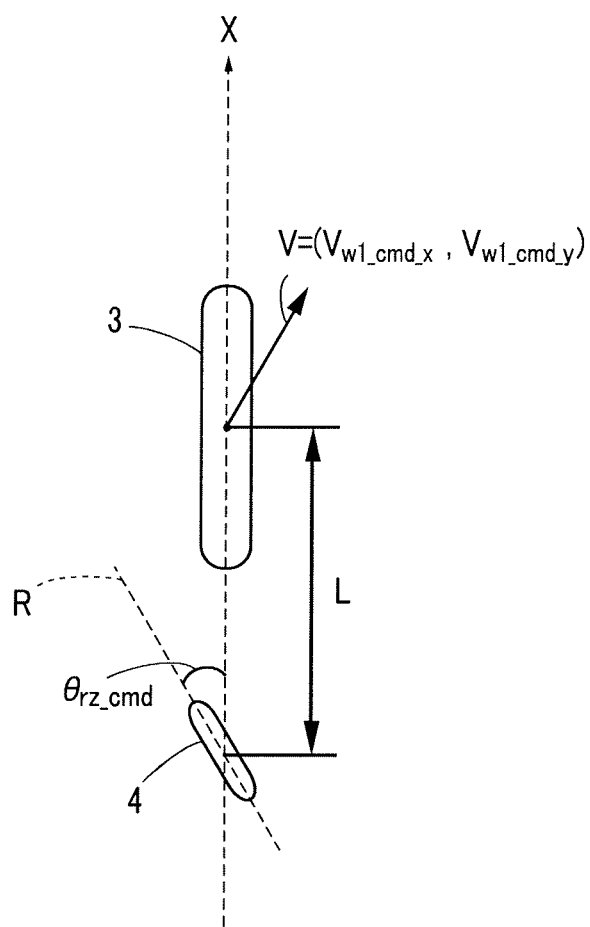
FIG. 10 is a diagram illustrating a relationship between a traveling motion unit, a wheel, a moving velocity vector, and a desired steering angle.

Here, Δt is an arithmetic processing cycle[sec], and L is a length between the center of the traveling motion unit 3 viewed from above the vehicle 1 (the rotational central axis of the annular core member 6) and the rotational center of the wheel 4, as is shown in FIG. 10. Further, ωz is the turn angular velocity of the vehicle 1, Vw1_x is the translational velocity of the vehicle 1 in the longitudinal direction (the X-axis direction), and Vw1_y is the translational velocity of the vehicle 1 in the lateral direction (the Y-axis direction).

Further, as is shown in FIG. 10, the desired steering angle θrz_cmd denotes the angle of the wheel 4 in the rolling direction R, with respect to the X-axis which is the forward direction of the vehicle 1.

The third process unit 253 uses the desired turn angular velocity ωz_cmd output from the second process unit 252 as ωz in expression (6a1) and expression (6a2), uses the desired translational velocity in the longitudinal direction (the X-axis direction) Vw1_cmd_x output from the first control unit 24 as Vw1_x, and uses the desired translational velocity in the lateral direction (the Y-axis direction) Vw1_cmd_y output from the first control unit 24 as Vw1_y. By doing so, the third process unit 253 determines A and B that are defined by expression (6a1) and expression (6a2). Thereafter, the third process unit 253 determines the desired steering angle θrz_cmd by expression (6b) from the determined values of A and B.

Thereafter, the fourth process unit 254 outputs, in the case where the desired steering angle θrz_cmd determined in the third process unit 253 exceeds a predetermined upper limit value, a value obtained by performing a limit process of limiting to the predetermined upper limit value, as the new desired steering angle θrz_cmd. At this time, the desired steering angle θrz_cmd output from the fourth process unit 254 becomes the output of the second control unit 25.

Next, the processing by the second control unit 25 when the magnitude of the desired turn angular velocity ωz_cmd is the magnitude smaller than the predetermined value ωa will be explained. In this case, the sixth process unit 256 sets the desired steering angle θrz_cmd to zero, and the desired steering angle θrz_cmd set to zero becomes the output of the second control unit 25.

Thereafter, the second control unit 25 operates the electric motor 14 as a second actuator, so that the steering angle of the wheel 4 becomes the desired steering angle θrz_cmd.

As is explained above, when the magnitude of the desired turn angular velocity ωz_cmd is the magnitude equal to or larger than the predetermined value ωa, the second control unit 25 determines the desired steering angle θrz_cmd so that the steering direction of the wheel 4 when the vehicle 1 is viewed from above becomes changed with respect to the direction of the moving velocity vector V represented by the desired translational velocity Vw1_cmd_xy newly set by the posture control arithmetic unit 34 of the first control unit 24 (hereinafter referred to as a new moving velocity vector V), and controls the electric motor 14 as the second actuator so that the steering angle of the wheel 4 becomes the desired steering angle θrz_cmd.

By doing so, the rolling direction of the wheel 4 becomes the state changed with respect to the direction of the new moving velocity vector V of the traveling motion unit 3. When the first control unit 24 actuates the first actuator 8 in this state and makes the traveling motion unit 3 travel, since the rolling direction R of the wheel is changed with respect to the moving direction of the traveling motion unit 3, the occupant may turn the vehicle 1 easily, without requiring skillful maneuvering technique and the like of the occupant.

Further, at this time, as is expressed by expressions (6a), (6a1), and (6a2), the second control unit 25 determines the desired steering angle θrz_cmd of the wheel 4 according to expression (6b) obtained on the basis of the geometry model (the kinematics model) representing the rotational behavior of the vehicle 1 in the yaw direction according to the steering of the wheel 4. By doing so, the steering angle of the wheel 4 becomes an appropriate angle for turning the vehicle 1, so that the occupant may turn the vehicle 1 easily.

Further, when "the magnitude of the current moving velocity vector V is the magnitude smaller than the predetermined value Vα" and also when "the magnitude of the desired turn angular velocity ωz_cmd is the magnitude equal to or larger than the predetermined value ωa", the desired tilt angle setting unit 80 of the first control unit 24 sets the tilt angle offset θb_ofs_y of the occupant mounting section 5 according to the current moving velocity vector V and the desired turn angular velocity ωz_cmd. By doing so, in the case where the turning of the vehicle 1 is difficult, such as in the travel stopped state of semi-travel stopped state, the desired tilt angle setting unit 80 sets the tilt angle offset θb_ofs_y so that the magnitude of the moving velocity in the lateral direction Vw1_cmd_y of the traveling motion unit 3 becomes larger. By doing so, the vehicle travels in the lateral direction, so that the occupant may turn the vehicle 1 easily.

Further, at this time, the desired tilt angle setting unit 80 sets the second ratio R2 such that as the magnitude of the current moving velocity vector V becomes larger, the desired tilt angle θb_cmd_xy when "the magnitude of the current velocity vector V is the magnitude smaller than the predetermined value Vα", and also when "the desired turn velocity ωz_cmd is the magnitude equal to or larger than the predetermined value ωa" to approach the desired tilt angle θb_cmd_xy in the state where the turning command is not output from the joystick 12 and also the traveling motion unit 3 is stopped, that is, to approach 0. That is, the desired tilt angle setting unit 80 sets the second ratio R2 (and consequently the tilt angle offset θb_ofs_y) to become larger as the magnitude of the current moving velocity vector V becomes smaller.

By doing so, in the semi-travel stopped state in which the turning of the vehicle 1 is difficult, the desired tilt angle θb_cmd_xy is set such that as the magnitude of the moving velocity vector V is smaller, the state of vehicle 1 depart from the state where the turning command is not output and also the state where the traveling motion unit 3 is stopped, that is, such that the magnitude of the moving velocity component in the lateral direction Vw1_cmd_y of the traveling motion unit 3 becomes larger. By doing so, as the moving velocity vector V of the traveling motion unit 3 in the semi-travel stopped state becomes smaller, the moving velocity in the lateral direction Vw1_cmd_y of the traveling motion unit 3 becomes larger. Therefore, the occupant may turn the vehicle 1 easily by the steering of the wheel 4.

Also, by doing so, for example when the magnitude of the current moving velocity vector V of the traveling motion unit 3 "switches from equal to or larger than the predetermined value Vα to the magnitude smaller than the predetermined value Vα" or "switches from smaller than the predetermined value Vα to the magnitude equal to or larger than the predetermined value Vα", it becomes possible to suppress the tilt angle offset θb_ofs_y from changing abruptly, and to suppress the abrupt behavior change of the vehicle 1.

Further, the desired tilt angle setting unit 80 sets the tilt angle offset θb_ofs_y to be larger, such that as the magnitude of the desired turn angular velocity ωz_cmd becomes larger, the magnitude of the moving velocity in the lateral direction Vw1_cmd_y of the traveling motion unit 3 becomes larger. By doing so, in the case where the magnitude of the desired turn angular velocity ωz_cmd is large, the desired tilt angle setting unit 80 sets the moving velocity in the lateral direction Vw1_cmd_y of the vehicle 1 large, so that it becomes possible for the occupant to turn the vehicle easily so as to satisfy the desired turn angular velocity ωz_cmd.

Further, in the case where the magnitude of the current moving velocity vector V is the magnitude equal to or larger than the predetermined value Vα, the desired tilt angle setting unit 80 is moving at a velocity capable of turning smoothly. Therefore, it is not necessary to further tilt the occupant mounting section 5 for turning, so that the desired tilt angle setting unit 80 sets the tilt angle offset θb_ofs_y to zero. By doing so, it becomes possible to prevent tilting the vehicle 1 more than necessary.

The process of the desired tilt angle setting unit 80 in the present embodiment corresponds to "a step of setting a desired tilt angle which is a desired value of a tilt angle of the occupant mounting section" of the present invention. Further, the process of actuating the first actuator 8 by the first control unit 24 of the present embodiment so that the moving velocity of the traveling motion unit 3 becomes the desired translational velocity Vw1_cmd_xy output by the posture control arithmetic unit 34 corresponds to "a step of controlling a moving velocity of the traveling motion unit via the first actuator" of the present invention. Further, the process of actuating the electric motor 14 as the second actuator by the second control unit 25 of the present embodiment so that the steering angle of the wheel 4 becomes the desired steering angle θrz_cmd corresponds to "a step of controlling the second actuator such that a steering direction of the wheel viewed from above the inverted pendulum type vehicle becomes changed with respect to a direction of a moving velocity vector of the traveling motion unit" of the present invention.

In the present embodiment, the previous value of the desired translational velocity Vw1_cmd_xy(k−1) is used as the current moving velocity vector V input to the first control unit 24 and the second control unit 25, when the desired tilt angle setting unit 80 of the first control unit 24 sets the desired tilt angle θb_cmd_xy, and when the second control unit 25 sets the desired steering angle θrz_cmd, however, it is not limited to this as long as the value is capable of representing the current moving velocity of the occupant mounting section 5. For example, a sensor and the like which is capable of detecting the moving velocity of the traveling motion unit 3 may be provided to the vehicle, and the moving velocity obtained from an observed value of the sensor may be used as the current moving velocity vector V.

Further, in the present embodiment, the second control unit 25 sets the desired steering angle θrz_cmd using desired values such as the desired turn angular velocity ωz_cmd and the desired translational velocity Vw1_cmd_xy. However, by using a sensor which detects the turn angular velocity of the vehicle 1, and a sensor which detects the translational velocity of the vehicle 1 and the like, the desired steering angle θrz_cmd may be set using the observed values. In this case, either one of the desired value and the observed value may be independently used for each of the turn angular velocity and the translational velocity.

Further, in the present embodiment, the second control unit 25 sets the desired steering angle θrz_cmd using the desired turn angular velocity ωz_cmd and the desired translational velocity Vw1_cmd_xy, on the basis of the geometry model (the kinematics model). However, it is not limited to this, and the desired steering angle θrz_cmd may be set using a dynamics model. In this case, either of the desired value and the observed value may be independently used for each of the turn angular velocity, the turn angular acceleration, the translational velocity, and the translational acceleration.

Further, in the present embodiment, when the magnitude of the current moving velocity vector V is smaller than the predetermined value Vα, the desired tilt angle setting unit 80 sets the second ratio R2 (and consequently the tilt angle offset θb_ofs_y) to be larger as the magnitude becomes smaller. However, it is not limited to this. For example, in the case where a magnitude of an X-direction component of the current moving velocity vector V is smaller than the predetermined value Vα, the desired tilt angle setting unit 80 may set the second ratio R2 (and consequently the tilt angle offset θb_ofs_y) to be larger as the magnitude becomes smaller.

Further, in the present embodiment, the tilt angle offset θb_ofs_y (and consequently the desired tilt angle θb_cmd_xy) is set from the first ratio R1 determined according to the desired turn angular velocity ωz_cmd, the second ratio R2 determined according to the moving velocity vector V, and the predetermined gain Kofs. However, it is not limited to this. For example, the desired tilt angle θb_cmd_xy may be set from the desired turn angular velocity ωz_cmd and the moving velocity vector V, according to a preliminarily given map.

Further, in the present embodiment, the desired turn angular velocity ωz_cmd is included in the turning command output from the joystick 12. However, it is not limited to this. For example, it may be of a configuration where, when the turning command is output, the desired turn angular velocity ωz_cmd is set to a constant angular velocity with a magnitude not zero.

Further, the desired tilt angle setting unit 80 may not be equipped with all of the third process unit 803 and the fourth process unit 804, or may not be equipped with at least one of the process units 803 and 804. Even in this case, by setting the tilt angle offset θb_ofs_y and the desired steering angle θrz_cmd, the effect of the present invention, that is, the effect that the occupant may be able to turn the vehicle easily, without requiring skillful maneuvering technique and the like of the occupant, may be obtained.

Further, in the present embodiment, the joystick 12 is configured as the turning command output unit of the present invention. However, it is not limited to this, as long as it could output the turning command. For example, the turning command output unit may be a manipulation device of a lever shape, a button, or a button realized by a software by a touch panel device.

What is claimed is:

1. An inverted pendulum vehicle at least comprising: a traveling motion unit configured to be capable of traveling on a floor surface; a first actuator that drives the traveling motion unit; a base body to which the traveling motion unit and the first actuator are installed; and an occupant mounting section attached to the base body such that the occupant mounting section is tiltable relative to a vertical direction, wherein the traveling motion unit is configured to be capable of traveling in all directions, including a longitudinal direction and a lateral direction relative to an occupant on the occupant mounting section, by a driving force of the first actuator, the inverted pendulum vehicle further comprising:
   a wheel, which is connected to the traveling motion unit or the base body at an interval from the traveling motion unit in the longitudinal direction, which is configured to be capable of rolling freely on the floor surface, and which is provided so as to be steered in a yaw direction;
   a second actuator which steers the wheel in the yaw direction;
   a turning command output unit configured to output a turning command for turning the inverted pendulum vehicle; and
   a controller configured to control operations of the first actuator and the second actuator, wherein
   the controller is equipped with a first control unit which is configured to control the first actuator so as to make the traveling motion unit travel at least according to tilting of the occupant mounting section, and a second control unit configured to control the second actuator such that, in a case where the turning command is output from the turning command output unit, a steering direction of the wheel viewed from above the inverted pendulum vehicle is changed with respect to a direction of a moving velocity vector of the traveling motion unit,
   the first control unit is configured to control a moving velocity of the traveling motion unit at least according to a deviation between a desired tilt angle which is a desired value of a tilt angle of the occupant mounting section and an observed value of a tilt angle of the occupant mounting section via the first actuator, and
   the controller is further equipped with a desired tilt angle setting unit configured to set, in a case where the turning command is output from the turning command output unit the desired tilt angle such that a magnitude of a moving velocity component in the lateral direction of the traveling motion unit controlled by the first control unit according to the deviation in a travel stopped state or a semi-travel stopped state is larger than the magnitude in a traveling state, traveling of the traveling motion unit is stopped in the travel stopped state, the magnitude of the moving velocity of the traveling motion unit is smaller than a predetermined value in the semi-travel stopped state, and the magnitude of the moving velocity of the traveling motion unit is equal to or larger than the predetermined value in the traveling state.

2. The inverted pendulum vehicle according to claim 1, wherein the turning command includes an angular velocity command value indicating a desired value of an angular velocity in a yaw direction of the inverted pendulum vehicle, and the desired tilt angle setting unit sets, in a case where the turning command is output from the turning command output unit in the travel stopped state or the semi-travel stopped state, the desired tilt angle such that the magnitude of the moving velocity component in the lateral direction of the traveling motion unit becomes larger as a magnitude of the desired value of the angular velocity indicated by the angular velocity command value becomes larger.

3. The inverted pendulum vehicle according to claim 1, wherein the desired tilt angle setting unit sets, in a case where the turning command is output from the turning command output unit in the semi-travel stopped state, the desired tilt angle such that the magnitude of the moving velocity component in the lateral direction of the traveling motion unit becomes larger as the magnitude of the moving velocity of the traveling motion unit in the semi-travel stopped state becomes smaller.

4. The inverted pendulum vehicle according to claim 1, wherein the second control unit determines a desired steering angle which is a desired value of a steering angle of the wheel, using a value of moving velocity of the traveling motion unit, and a value of angular velocity in the yaw direction of the inverted pendulum vehicle, based on a model representing a rotational behavior of the inverted pendulum vehicle in the yaw direction according to a steering of the wheel, and controls the second actuator according to the desired steering angle, and wherein the value of the moving velocity is one of an observed value of the moving velocity and a desired value of the moving velocity, and the value of the angular velocity is one of an observed value of the angular velocity and a desired value of the angular velocity.

5. A control method of an inverted pendulum vehicle at least comprising:

a base body;

an occupant mounting section attached to the base body such that the occupant mounting section is tiltable relative to a vertical direction;

a traveling motion unit attached to the base body and configured to be capable of traveling in all directions on a floor surface, including a longitudinal direction and a lateral direction relative to an occupant on the occupant mounting section;

a first actuator attached to the base body and that drives the traveling motion unit;

a wheel, which is connected to the traveling motion unit or the base body at an interval from the traveling motion unit in the longitudinal direction, which is configured to be capable of rolling on the floor surface, and which is provided so as to be steered in a yaw direction;

a second actuator which steers the wheel in the yaw direction; and a turning command output unit configured to output a turning command, wherein the control method includes a step of setting a desired tilt angle which is a desired value of a tilt angle of the occupant mounting section, in a case where the turning command is output from the turning command output unit, a step of controlling a moving velocity of the traveling motion unit via the first actuator, according to a deviation between the desired tilt angle and an observed value of the tilt angle of the occupant mounting section, and a step of controlling, in a case where the turning command is output from the turning command output unit, the second actuator such that a steering direction of the wheel viewed from above the inverted pendulum vehicle becomes changed with respect to a direction of a moving velocity vector of the traveling motion unit, and wherein the step of setting the desired tilt angle sets, in a case where the turning command is output from the turning command output unit, in a travel stopped state in which traveling of the traveling motion unit is stopped, or in a semi-travel stopped state in which a magnitude of a moving velocity of the traveling motion unit becomes smaller than a predetermined value set preliminarily, the desired tilt angle such that a magnitude of a moving velocity component in the lateral direction of the traveling motion unit becomes larger than that in the travel stopped state or the semi-travel stopped state.

\* \* \* \* \*